(12) United States Patent
Leeser

(10) Patent No.: US 8,219,308 B2
(45) Date of Patent: Jul. 10, 2012

(54) MONOWHEEL TYPE VEHICLE

(76) Inventor: Karl F. Leeser, San Jose, CA (US)

( * ) Notice: Subject to any disclaimer, the term of this patent is extended or adjusted under 35 U.S.C. 154(b) by 404 days.

(21) Appl. No.: 12/699,002

(22) Filed: Feb. 2, 2010

(65) Prior Publication Data

US 2011/0191013 A1 Aug. 4, 2011

(51) Int. Cl.
*G06F 17/10* (2006.01)

(52) U.S. Cl. .............. 701/124; 701/69; 701/70; 701/71; 701/72; 701/73; 180/248; 180/197; 180/233; 180/247; 475/86; 475/88; 475/231; 303/9.67; 303/113.5; 303/139; 303/146; 303/171; 280/47.32; 224/184

(58) Field of Classification Search .................... 701/69, 701/70, 71, 72, 73, 74, 78, 79, 83, 89, 124; 180/1.5, 197, 233, 247, 248, 249; 303/9.67, 303/113.5, 139, 146, 171; 280/47.32; 224/184; 70/226; 475/86, 88, 231
See application file for complete search history.

(56) References Cited

U.S. PATENT DOCUMENTS

| | | | |
|---|---|---|---|
| 3,399,742 A | 9/1968 | Malick | |
| 4,109,741 A | 8/1978 | Gabriel | |
| 4,511,155 A * | 4/1985 | Galloway | 280/204 |
| 4,690,427 A * | 9/1987 | Raidel, Sr. | 280/124.118 |
| 5,975,225 A | 11/1999 | Kamen et al. | |
| 6,357,544 B1 | 3/2002 | Kamen et al. | |
| 6,367,817 B1 | 4/2002 | Kamen et al. | |

FOREIGN PATENT DOCUMENTS

| | | | |
|---|---|---|---|
| WO | 8906117 A1 | | 7/1989 |
| WO | WO 2008001161 | * | 1/2008 |

OTHER PUBLICATIONS

David William Vos, "Nonlinear Control of an Autonomous Unicycle Robot: Practical Issues," MIT-Unicycle-Thesis, Jun. 5, 1992, pp. 1-207.

* cited by examiner

*Primary Examiner* — James Trammell
*Assistant Examiner* — McDieunel Marc
(74) *Attorney, Agent, or Firm* — Patent Law Group LLP; Brian D. Ogonowsky

(57) ABSTRACT

An engine-propelled monowheel vehicle comprises two wheels, close together, that circumscribe the remainder of the vehicle. When the vehicle is moving forward, the closely spaced wheels act as a single wheel, and the vehicle turns by leaning the wheels. A single propulsion system provides a drive torque that is shared by the two wheels. A separate steering torque, provided by a steering motor, is added to one wheel while being subtracted from the other wheel, enabling the wheels to rotate in opposite directions for turning the vehicle at zero forward velocity. The vehicle employs attitude sensors, for sensing roll, pitch, and yaw, and an automatic balancing system. A flywheel in the vehicle spins at a high rate around a spin axis, wherein the spin axis is rotatable with respect to the vehicle's frame. The axis angle and flywheel spin speed are continually adjustable to generate torques for automatic balancing.

43 Claims, 10 Drawing Sheets

MONOWHEEL TYPE VEHICLE

FIELD OF THE INVENTION

The present invention relates to motorized vehicles and, in particular, to a monowheel type vehicle where the outer periphery of a wheel circumscribes and rotates around the motor, and rotation of the wheel over a surface propels the vehicle.

BACKGROUND OF THE INVENTION

Monowheel vehicles of various sorts exist. An advantage of a monowheel vehicle over multi-wheeled vehicles is that the radius of the wheel is maximized relative to the size of a given vehicle, enabling the vehicle to negotiate larger obstacles than conventional vehicles situated atop smaller wheels. Many of the known monowheel vehicles transport a person, where the person circumscribed by the wheel provides the propulsion power as well as balances the vehicle. An excellent catalog of the history of this seemingly bizarre type of vehicle can be found at the following web addresses: dself.dsl.pipex.com/MUSEUM/TRANSPORT/MOTOR-WHL/motorwhl.htm; and dself.dsl.pipex.com/MUSEUM/TRANSPORT/MOTORWHL/motorwh12.htm#coat.

A brief chronology of monowheel vehicles is presented below, primarily obtained from the websites identified above.

1869—First monowheel patent, by Bergner, featuring hand crank and foot treadle actuation (Bergner, U.S. Pat. No. 91,510). Teaches dual tires attached to a single wheel.

1869—Greene & Dyer hand crank-driven monowheel patent (Greene et al., U.S. Pat. No. 91,535)

1884—Figure from book, "Victorian Inventions" suggests a monowheel vehicle that appears to indicate dual tires attached to a single wheel like the Bergner patent.

1892—Harper pedal-powered monowheel patent (Harper, U.S. Pat. No. 511,139)

1897—Venable monowheel patent, essentially a bicycle inside a large wheel (Venable, U.S. Pat. No. 611,534). There is a suggestion to design the wheel as the outer race of a giant ball bearing with the frame comprising the inner bearing race.

1904—The Monocycle Garavaglia, the first monowheel with an engine.

1912—Coates propeller-driven monowheel patent (Coates, U.S. Pat. No. 1,046,267)

1917—D'Harlingue propeller-driven monowheel patent (D'Harlingue, U.S. Pat. No. 1,228,100)

1923—Cislaghi monowheel. Cislaghi & Govetosa received a French patent in 1924 (No. 573,801). The patent seems to indicate that the plane of the wheel can be tilted from the plane of the rider, ostensibly to keep the wheel away from the riders head. A photo from around the same time doesn't seem to show such a tilt, but a photo caption suggests retracting stabilizer wheels that extend when the vehicle stops. Cislaghi received a British patent in 1927 (No. 275647). The Motoruota company was founded by Cislaghi in 1927 in an attempt to commercialize this monowheel vehicle.

1923—E. J. Christie monowheel appears in "Everyday Science & Radio News" and features a flywheel on each side of the main, driven wheel that "act as gyroscopic balancers and rudders".

1926—Gyrocycle pedal-powered monowheel

1932—J. H. Purves' "Dynosphere". It is a monowheel that is wide enough that static stability provides balance from side-to-side. One photo from Popular Science depicts a smaller version that is electrically-powered.

1933—Gutierrez's 3-wheeled, "monowheel"-like armed and amphibious tank patent (Gutierrez, U.S. Pat. No. 1,915,886).

1937—Rose monowheel patent (Rose, U.S. Pat. No. 2,107,766) includes external wheel to prevent rotation due to excessive acceleration or deceleration.

1940s—Inverted pendulum control problem.

1968—Malick unicycle patent using a gyroscope to measure pitch attitude and provide feedback for control of a planar unicycle.

1994—David Vos designed and implemented a unicycle robot with automatic balance control (Vos, MIT Ph.D. thesis, May 1992).

1997—Chiba University unicycle robot employing gyroscopic actuation to provide dynamic stability about the roll axis.

2000—Owen "di-wheel" with two wheels separated by approximately one wheel diameter to permit two riders to sit in between the wheels.

2003—Jake Lyall introduces the RIOT (Re-Invention Of The) wheel. Instead of using the rider's weight to provide the reaction to the engine's thrust on the wheel, the reaction torque is provided by a lead-weighted scooter engine suspended from the main wheel axle, powered through a sprocket. The rider sits in front of the wheel and a 450-pound internal counterweight keeps the rider hovering above the ground at the front. The rider steers the vehicle by a combination of precessing a 65-pound gyroscope and shifting his weight.

2005—Wheelsurf markets a commercial monowheel vehicle. See following web address: wheelsurft.nl/.

In the monowheel examples, the human driver, circumscribed by the wheel, controls the balance and turns by leaning. The vehicle must have some velocity in order for the driver to maintain balance, using the gyroscopic effect of the spinning wheel to maintain balance, similar to a standard bicycle or motorcycle.

The present inventor realized that a monowheel vehicle that does not transport a rider has some important uses, even though complexity is somewhat increased in order to incorporate an automatic balance control mechanism. For example, a riderless vehicle could be equipped with a camera or other payload and be remotely operated at much higher speeds and over rugged terrain including climbing stairs. A monowheel vehicle presents a minimal frontal cross section, which is useful to navigate narrow entry ways, improve its ability to hide behind objects, and reduce its profile as seen from a distance. If the vehicle were able to turn at zero forward velocity, the vehicle would be able to more easily navigate confined spaces and at slower speeds. Such capability is not possible with the known monowheel vehicles.

SUMMARY

A monowheel vehicle is described herein that comprises two wheels close together that enable the vehicle to turn at zero forward velocity by rotating the wheels in opposite directions, rather than relying on leaning the vehicle at some forward velocity to turn it. The center of gravity is located below the wheels' axes of rotation, and the wheels rotate around the propulsion system. When the vehicle is moving straight and forward, the closely spaced wheels act as a single wheel.

An active differential gear mechanism, controlled by a steering motor, is employed to achieve such differential wheel actuation. A single propulsion system provides a drive torque that is shared by the two wheels. A separate steering torque is added to one wheel while being subtracted from the other wheel for turning the wheels at different speeds and directions. This enables the vehicle to turn in any direction at both zero and low speeds, as long as both wheels are in contact with the ground, without relying on tilting the vehicle to turn.

The steering motor can be disengaged when not in use, such as by a clutch, reducing the active differential to a passive differential to allow the wheels to turn at different speeds, such as when turning at a forward velocity.

In one embodiment, immediately prior to the vehicle being powered down, the two wheels are moved apart from each other (e.g., by means of an electric motor) so that the vehicle may remain upright when in the powered down state. When the vehicle is switched to its active state, the two wheels are automatically moved close together with a combined contour resembling a single wheel.

The vehicle employs attitude sensors (for sensing roll, pitch, and yaw) and an automatic balancing system. A flywheel in the vehicle spins at a high rate around a spin axis. The flywheel may be a balanced electric motor that rotates around an axis (a shaft) wherein the shaft comprises the stator and the body of the motor comprises the rotor. The spin axis is connected to a frame of the vehicle by a pivot or gimbal that is rotatable by an electric orientation motor such that the combination of flywheel and actuated gimbal comprise a gyroscopic actuator. The axis angle may be continually adjusted, and/or the flywheel speed is continually adjusted, so that the flywheel provides a torque in any desired direction to maintain the vehicle's balance, whether the vehicle is going straight or turning. Two gyroscopic actuators are provided in one embodiment so that one gyroscopic actuator can be used to cancel out undesired steady torques created by the other gyroscopic actuator or provide net torque vector combinations not possible with a single actuator. In a steady state condition, the flywheels are at opposite 45 degree angles to the vehicle centerline (the $\hat{x}$ axis) and spin in opposite directions to cancel out any yawing component in the gyroscopic torques applied if only a single flywheel were employed. The two flywheels can also be used to double the torque when needed by changing their angles and speeds. Various other advantages exist using the two flywheels.

Rapid mechanical braking of the flywheels and/or rapid control of the axis angle can be used to create torques that cause the vehicle to right itself from a horizontal, minimum gravitational potential energy position. The flywheel acceleration or deceleration may also be controlled by controlling power to the flywheel motors.

The gyroscopic actuators and their control methods can also be used to dynamically balance a monowheel vehicle employing just a single wheel.

Various other features are described.

DETAILED DESCRIPTION OF THE INVENTION

The invention is a self-balancing, self-propelled, monowheel vehicle, having its center of mass (COM) located within the diameter of the wheel, where all components of the drive and balancing system are circumscribed by the periphery of the wheel. Possessing only a single wheel (or two wheels close together), the vehicle's posture (or attitude) is inherently statically unstable in its roll orientations and is challenged to maintain its pitch with arbitrary wheel acceleration torques. This general class of vehicles will be referred to as a "monowheel," even though the vehicle may have two closely spaced wheels.

Figure 1:
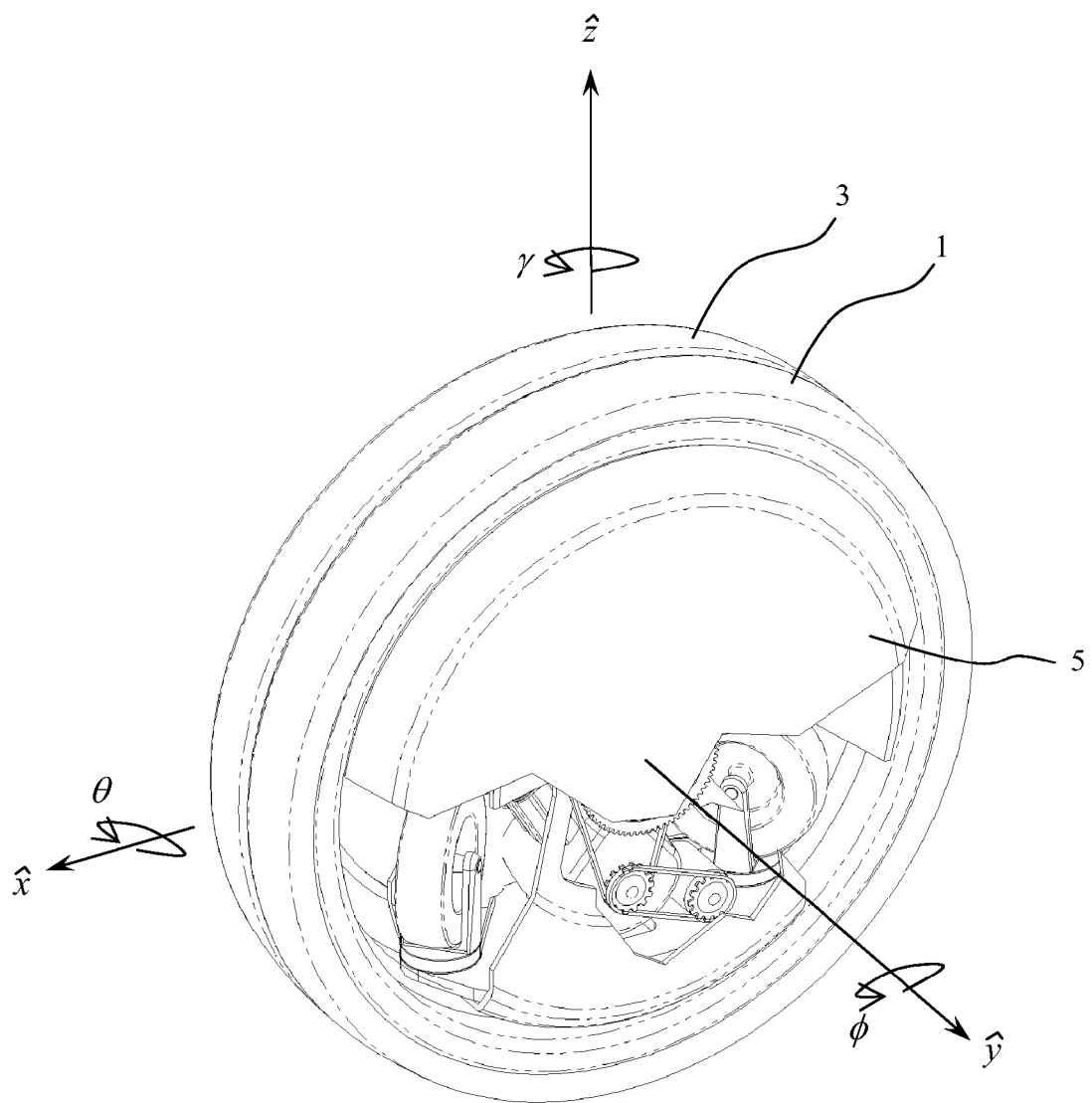
FIG. 1 is a perspective view of the monowheel vehicle with the left side cover partially cut away.
Figure 2:
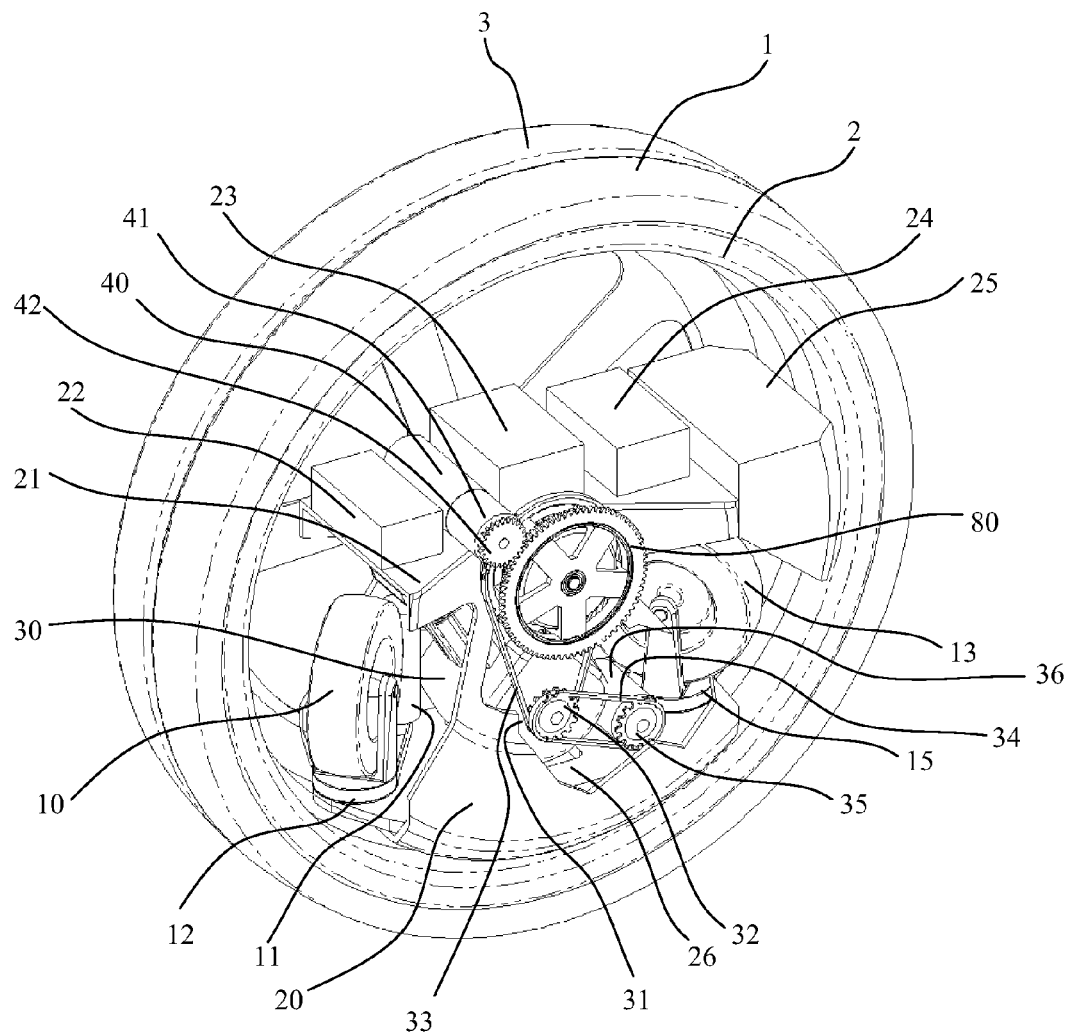
FIG. 2 is a perspective view showing various components of the vehicle with the left side cover removed.
Figures 3A, 3B:
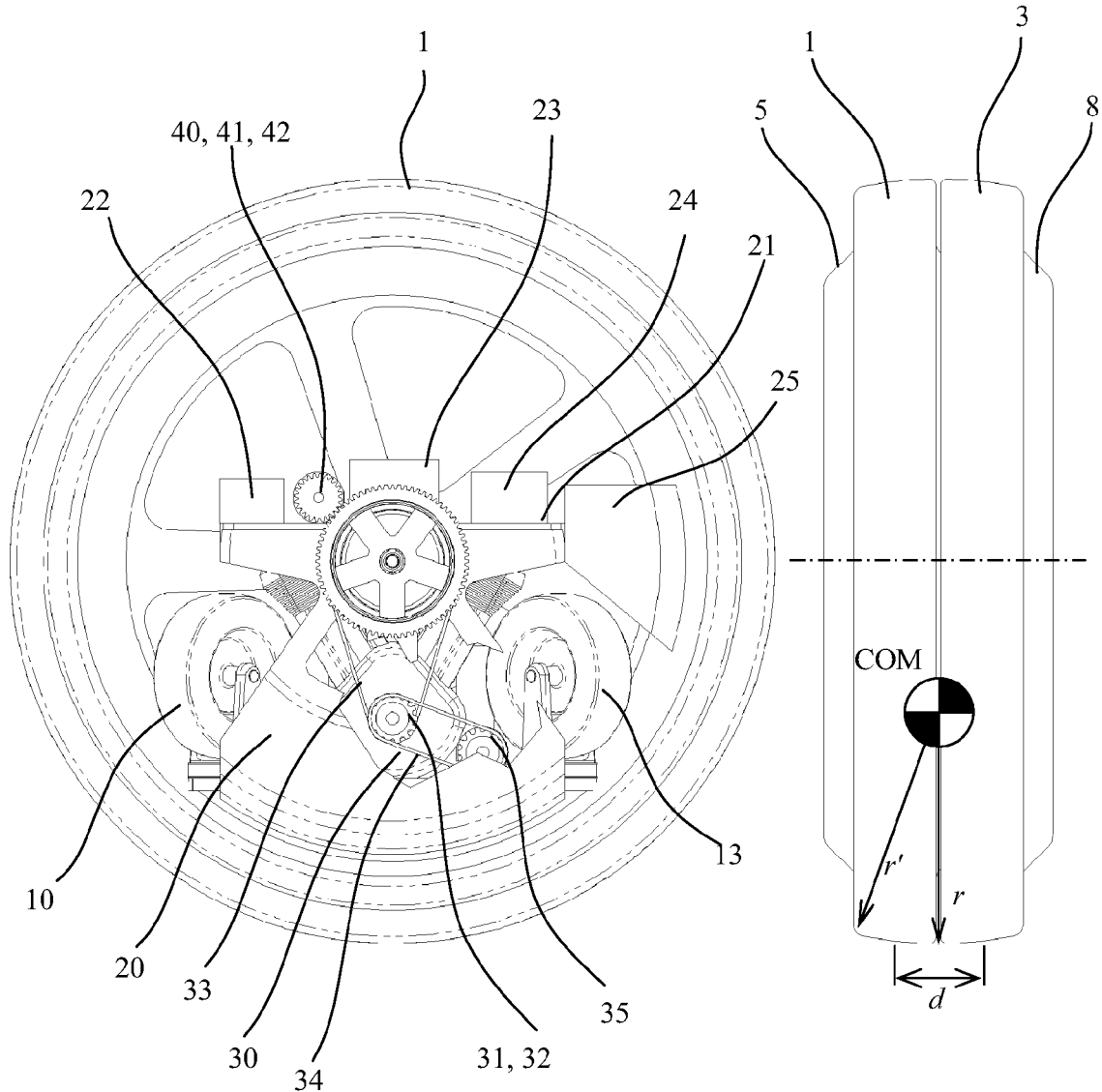
FIG. 3A is a left side view with the left side cover removed.
FIG. 3B is a head-on view showing the center of mass, directly below the center wheel axes of the vehicle.
Figure 4:
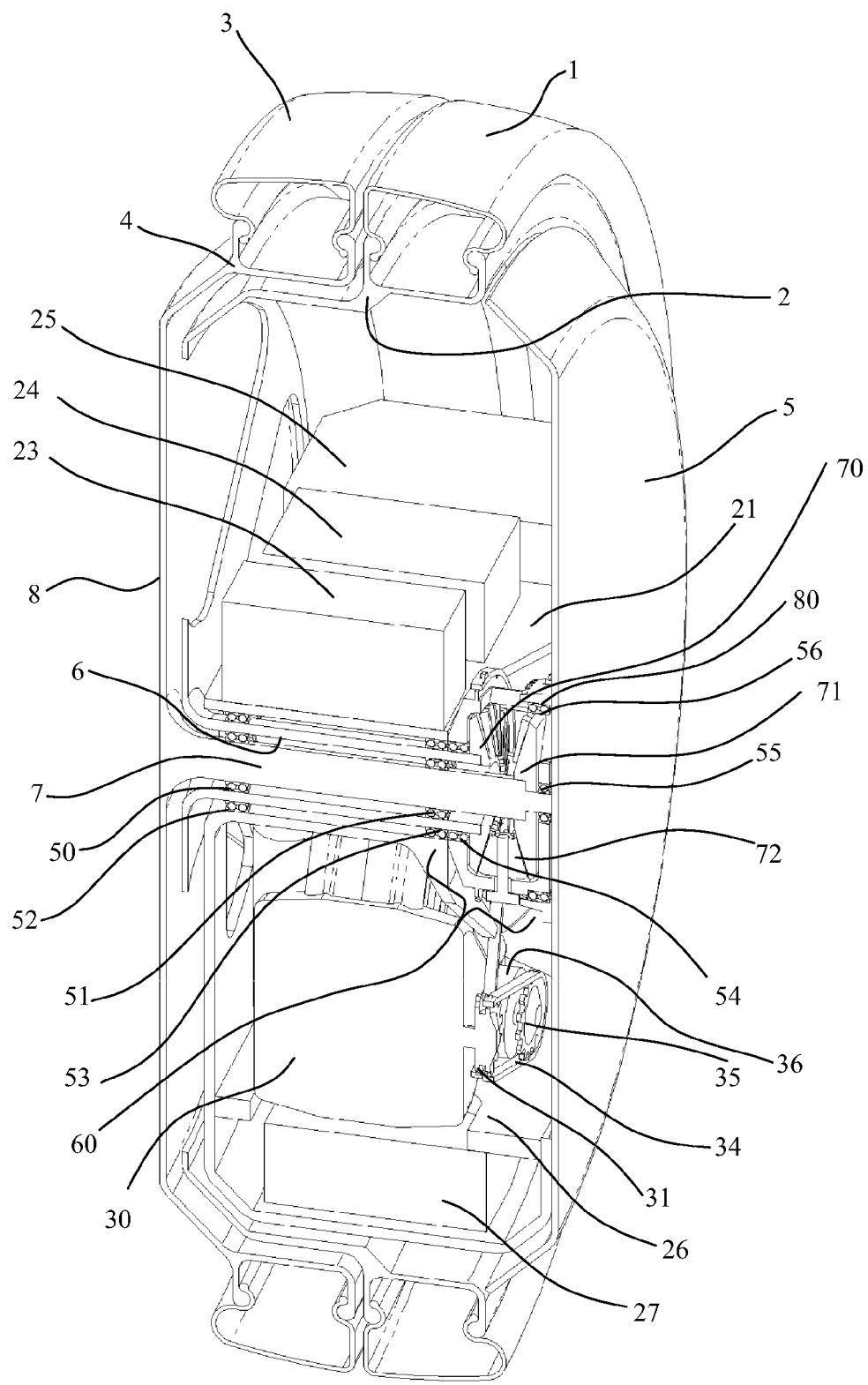
FIG. 4 is a perspective cross-sectional view vertically bisecting the vehicle.

FIGS. 1-5 illustrate one embodiment of the monowheel, which employs a left wheel 2 and a right wheel 4 (best shown in FIG. 4) parallel and coaxially mounted on a frame 20 (FIGS. 2 and 3A). The wheels 2 and 4 are separated by at most 20% of one wheel diameter (dimension, d, FIG. 3B). A left pneumatic tire 1 and a right pneumatic tire 3 are mounted on their respective wheels 2 and 4. A left wheel cover 5 and a right wheel cover 8 are attached to their respective wheels and rotate with the wheels 2 and 4.

A right wheel axle 7 (a solid axle, shown in FIG. 4) protrudes from the face of the right wheel 4. A left wheel axle 6 (a hollow axle, shown in FIG. 4) protrudes from the face of the left wheel 2 and is supported by a pair of laterally disposed bearings 50 and 51 (FIG. 4) to allow rotation around the right wheel axle 7. The axles may be considered shafts that spin around an axis of rotation to rotate the wheels. The shafts may be indirectly coupled to the wheels, such as by gears, rather than the axles being directly rotated by the differential assembly (described later). The wheel axle assembly is in turn supported by a pair of laterally disposed bearings 52 and 53 to allow rotation of both axles 6 and 7 relative to the frame 20.

Housed within the frame 20 is an internal combustion engine and transmission assembly 30 (FIGS. 2-5), which burns fuel from a fuel tank 25. The output of the transmission is a drive sprocket 31 and an alternator/generator drive sprocket 32 (FIG. 2). The drive sprocket 31 transmits rotary power to the wheels 2 and 4 through a drive chain 33 (FIGS. 2 and 3A). The alternator/generator drive sprocket 32 transmits rotary power to an alternator/generator 36 through an alternator/generator drive chain 34 engaged with an alternator/generator sprocket 35. The alternator/generator 36 charges a battery/fuel cell 27 (FIG. 4) located below a lower platform 26 connected to the frame 30.

Figure 5:
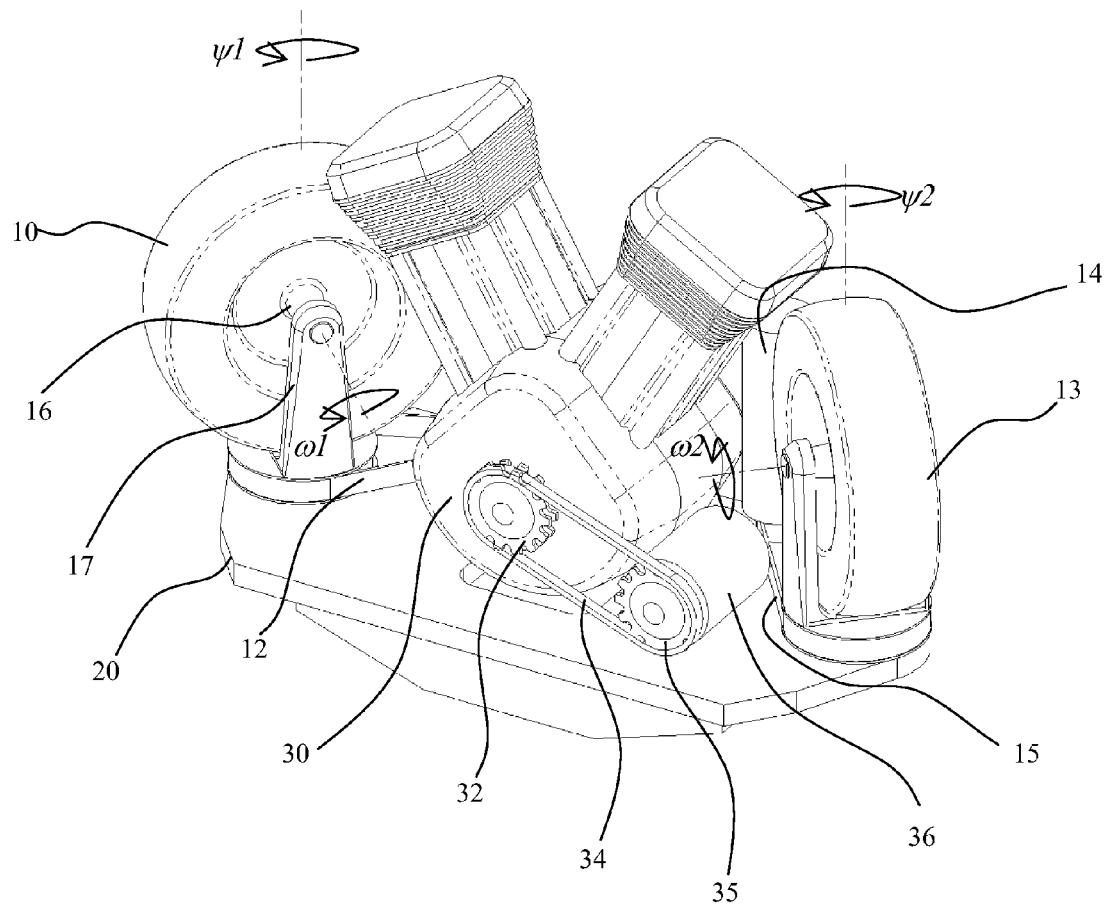
FIG. 5 is a perspective view illustrating the gas-powered engine, the alternator, and the flywheels.

Disposed on either side of the engine and transmission assembly 30 is a pair of identical gyroscopic actuator assemblies (FIGS. 2 and 5). A front flywheel spin motor assembly 10 comprises a motor that spins around a flywheel spin axis 16. The motor may be a conventional wire-wound motor that is balanced about the spin axis 16. Current to the motor windings is provided by a conventional slip ring contact fixed to the spin axis 16. The spinning motor assembly will be referred to as a flywheel. The spin axis 16 is connected within a yoke 17 that is mounted on a pivot so it can twist relative to the frame 20. A front flywheel orientation motor 11 (FIG. 2) controls the twisting motion through a front flywheel drive belt 12 around the bottom of the yoke 17. Taken together, this flywheel and actuated gimbal comprise the front gyroscopic actuator assembly. Similarly, a rear flywheel spin motor assembly 13, mounted on a pivot, has its flywheel spin axis oriented with a rear flywheel orientation motor 14 through a rear flywheel drive belt 15.

The flywheel orientation motors 11 and 14 are rotated using power from the battery/fuel cell 27.

One object of this invention is to make the monowheel vehicle dynamically stable by incorporating suitable means for providing corrective torques, via the flywheels, in response to perturbations about the pitch and roll axes. Maintenance of such a statically unstable posture or attitude is commonly referred to as balance.

Static instability in the pitch direction (forward and backward tilt in the plane of the wheel), $\phi$, can be desirable to reduce the effort required to reorient the pitch of the vehicle albeit at the expense of increased complexity of control and an aspect of this invention is to provide suitable compensation means. However, as a variant of this invention, passive stability in the pitch direction can be achieved simply by locating the center of mass (COM) of the vehicle (largely the drive system) below the axis of rotation of the wheel assembly, causing the drive system to remain in a natural position below the wheels' axes while the wheels rotate around the drive system. This is shown by the center of mass in FIG. 3B being below the wheels axes.

A degree of passive stability in the roll direction, $\theta$, can be achieved by contouring the tire geometry such that each tire's outer radius, r' (FIG. 3B), between the center of mass and contact with the ground, progressively increases as the roll angle increases from the minimum value of r. As a result, the minimum potential energy state occurs at $\theta=0$ and corrective torques are generated as $\theta$ strays from zero. This is the principle of the "Weeble-Wobble" toys popular in the 1970s.

Although the ground contact between an ideal wheel, defined as a simple disk of infinitesimal thickness, and the ground is a single point, in reality, a real wheel possesses a line contact with the ground, and a typical wheel tire contacts the ground with a finite footprint of finite area. As such, steering a single wheeled vehicle such as a unicycle requires the wheel to "skid" as it twists about the vehicle yaw ($\hat{y}$) axis. One object of the present invention is to provide the monowheel vehicle with a pair of slender wheels, with a small separation distance, to substantially reduce the amount of "skid" experienced by the wheel assembly and thereby substantially reduce the energy required to turn the vehicle at low speeds One aspect of this invention is the use of the flywheels to exert torques on the vehicle. This is accomplished in two ways: as reaction wheels and as gyroscopic actuators. The former case leverages the concept of Newton's third law roughly stated that for every action there is an equal and opposite reaction, such that when a small, rotational inertia rotating at high angular velocity changes rotational velocity, this exerts a reaction torque on the rest of the vehicle about its rotational axis. These changes in angular velocity can be positive or negative, corresponding to increasing or decreasing angular velocity, respectively. It is challenging to create flywheels that can speed up as fast as would be required to produce appreciable torques. However, it is relatively easy to brake quite rapidly. Such braking of the flywheels is particularly useful to right the vehicle from a fallen pose. Preferably, the rotating inertia is of low mass and the angular velocity is very high to minimize impact on overall vehicle weight. Energetically dissipative braking can occur by application of mechanical brakes or by dissipating the power on the electrical side by shorting the leads of the flywheel spin motors through a large regeneration resistor. One suitable type of mechanical brake is an electrically controlled clutch (e.g., a solenoid) mounted on each flywheel yoke 17 that presses a high friction surface against the rotating flywheel when actuated to quickly decelerate the flywheel by converting its kinetic energy into heat. Concurrently, power may be temporarily removed from the spinning flywheel motor to avoid high currents during the braking. If the flywheels are stepper motors, the stepper motors are rapidly stopped by stopping the pulses applied to the motor. Alternatively, mechanical power can be removed by regenerative braking, converting the kinetic energy of the flywheel into electrical energy and storing it in the battery/fuel cell assembly 27.

As gyroscopic actuators, the flywheels actively provide roll attitude control as well as pitch attitude control, especially during acceleration and deceleration of the wheels 2 and 4 when instability often arises. Twisting of each flywheel assembly about the $\psi$ axis (FIG. 5) where $\psi$ is the deflection of the pivot measured in inertial coordinates, by controlling the flywheel orientation motors 11 and 14, results in a gyroscopic torque about the $\hat{x}$ axis (FIG. 1) even at zero forward velocity ($\dot{x}=0$). The $\hat{x}$ axis is the roll axis in the example. A control law can be applied to servo this twisting motion to correct vehicle lean or roll, $\theta$. The flywheel orientation motors 11 and 14 are preferably servo motors or stepper motors for accurate angular control. The extent of angular control may be determined by a stored program or lookup table, accessed by the vehicle's CPU, in conjunction with the signals output by the vehicles attitude sensors. The correction may be discontinued when balance has been achieved, but in general, would be a continuous correction process. Only slight changes in torques generated by the flywheels may be made for slight imbalances, and more powerful changes in torques may be made for large imbalances. The torque adjustments may be graduated rather than binary to avoid abrupt changes and oscillations.

When negotiating turns, the turns themselves create a yawing motion with respect to inertial space that would create undesirable gyroscopic effects if only a single gyroscopic actuator (flywheel) were employed. Conversely, a single gyroscopic actuator used to compensate for pitch or roll may also generate a yaw component. To address this side effect, a pair of counter rotating (in both spin and twist) gyroscopic actuators should be employed to cancel out the yaw effect of the other. Therefore, the preferred vehicle employs the front and rear flywheel/spin motor assemblies 10 and 13.

The gyroscopic actuators (flywheels) have maximum impact on the roll axis, $\theta$, when they are oriented about $\psi$ (FIG. 5) such that the axis of flywheel rotation, $\omega$, is parallel to the pitch axis, $\phi$ (FIG. 1). However, in this orientation, they cannot exert any torque about the pitch axis. Similarly, the gyroscopic actuators have maximum impact on the pitch axis, $\phi$, when the axis of flywheel rotation, $\omega$, is parallel to the roll axis, $\theta$. Similarly, in this orientation, they cannot exert any torque about the roll axis. Therefore, it is optimum under typical balanced conditions that the flywheel axes remain approximately 90 degrees from each other so that at least one flywheel always maintains controllability over the pitch and roll axes. In addition, it is preferential that they remain approximately 45 degrees to both the pitch and roll axes, as shown in the figures. There may be conditions such as at constant forward velocity wherein pitch attitude control is less important and the flywheel axes may be reoriented closer to the pitch axis, such as approximately 20 degrees between ω and φ. Note that one skilled in the art can recognize that, although a pair of independently powered flywheels is used, a reversing differential transmission may be used to connect a single physical actuator to a pair of counter rotating rotational inertias. Although the transmission may result in thermodynamic losses, such employment may be preferential to limit the number of physical actuators required.

A practical vehicle of this type should incorporate some means of mechanical suspension to dampen the shocks of abrupt impact with the ground due to a fall or ballistic impact.

Benefits of the proposed arrangement include the following:

Improved ability to negotiate rough terrain. A monowheel presents the largest possible wheel radius for a given size of vehicle and can be considered somewhat analogous to a large tracked vehicle. A wheel can clear obstacles that are typically only a few percent of the wheel radius. In contrast, a monowheel vehicle can be designed to negotiate much larger obstacles relative to the wheel size, for example, staircases.

Improved ability to recover from a fall. As the tread of the wheel circumscribes the entire vehicle, the vehicle remains operable while alternative wheel arrangements would render other vehicles useless. If a fall results in the vehicle finding itself upside down in the conventional sense relative to normal pitch orientation of the vehicle, the vehicle's wheel tread still contacts the ground allowing the vehicle to continue to propel itself Minimal faceprint. Faceprint is the area presented by the object when viewed from the front or rear. A monowheel vehicle presents a minimal faceprint and derives similar benefit as Apache and Comanche helicopters wherein the minimal faceprint presents a small target area for hostile munitions attack.

Slender profile. The slender profile of a monowheel vehicle allows access through narrow apertures such as conventional doorways. In addition, a slender profile makes the vehicle easier to hide behind obstacles or other objects and to peer around corners with minimal exposure of the vehicle.

As the vehicle speed increases, the roll stability of the vehicle dynamically increases due to the gyroscopic effect of the increased wheel momentum which is much larger for a monowheel vehicle compared to alternative wheeled vehicles.

Ability to turn (about the yaw axis) at zero forward velocity.

Figure 6A:
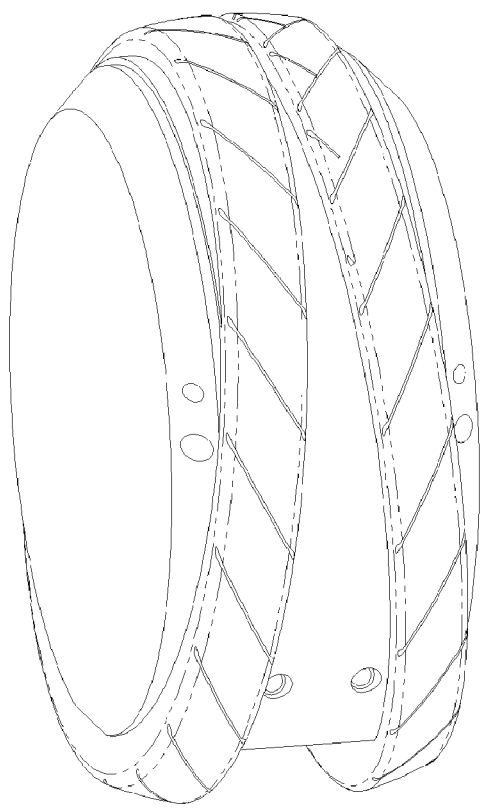
FIG. 6A is a front perspective view of an alternative monowheel type vehicle, where the wheels are automatically moved apart prior to the vehicle being powered down so that the vehicle remains upright in an unpowered state.
Figure 6B:
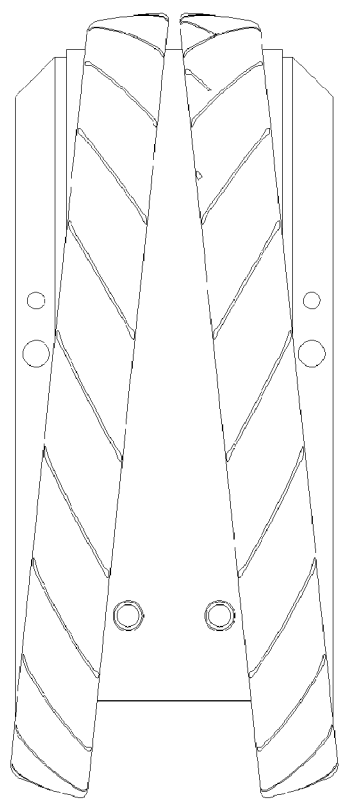
FIG. 6B is a front view of the vehicle of FIG. 6A.

Strictly speaking, the wheels need not be coaxial. FIGS. 6A and 6B illustrate a monowheel vehicle where the left and right wheels are at an angles with respect to each other and are substantially separated when contacting the ground so as to naturally remain upright at zero velocity. Stated another way, a non-coaxial tandem monowheel arrangement provides a measure of static stability in the roll direction. Due to the fact that the projection of the wheels onto the X-Z plane is an ellipse, it also provides a measure of passive stability in the pitch direction as well.

Static Balance (YZ Plane):

Static balance in the simplest case consists of maintaining the center of gravity (CG), which is the projection of the center of mass (COM) of an object collinear to the gravity vector, inside the effective contour of support projected onto a plane normal to the gravity vector.

The ground contact (GC) represents an instantaneous point or small region of ground contact, so if the CG remains above this point, then per the definition above, the vehicle is said to remain in a state of static balance. Intuitively, one can appreciate that an object's CG may temporarily fall outside the effective contour of support and still maintain balance. This situation is referred to as dynamic balance.

Strategies for Dynamic Balance:

The gyroscopic action of the large wheels 2 and 4 can produce a correcting action that provides a measure of dynamic stability. At higher velocities $\dot{x} \gg 0$, the angular momentum of the wheels in the XZ plane (FIG. 1) provides a resistance to tipping but in a complicated sense. Under this condition, gyroscopic precession causes the wheels spinning about the $\hat{y}$ axis to yaw (i.e., change forward direction of vehicle) in response to a roll motion (lean). The yaw torque due to this leaning motion is equal to:

$$\tau_z = J_w \omega_w \dot{\theta} \cos \theta$$

where the torque scales with the angular momentum, $J_w \omega_w$, about $\hat{y}$. But since the yaw dynamics, neglecting friction at the GC, is:

$$\tau_z = J_z \ddot{\gamma},$$

then $$J_z \ddot{\gamma} = J_w \omega_w \dot{\theta} \cos \theta.$$

This action is sometimes referred to as "steering into the turn" and is a natural property of gyroscopic effects on monowheels or bicycles. As a result, the wheel(s) no longer tracks along a straight-line trajectory, but rather, an arcing trajectory. If the yaw torque can result in turning the GC back under the CG before the roll dynamics cause the vehicle to tip too far, then the vehicle can be considered dynamically stable in roll.

Note that this phenomena doesn't require that the preferentially high angular momentum come from the wheel alone. The spinning flywheel(s), whose axis of rotation may be largely parallel to the wheel (or within 45 degrees, as previously mentioned) can also contribute:

$$\tau_z = (J_w \omega_w + J_f \omega_f \cos(\psi - \gamma)) \dot{\theta} \cos \theta.$$

As a result, a monowheel proceeding in the $\hat{x}$ direction with even a small nonzero velocity sizeable angular momentum about the $\hat{y}$ axis can produce a sizeable yaw torque due to the due to the spinning flywheel. Thus, due to the contribution of the flywheel, although it is possible to have sizeable angular momentum about the $\hat{y}$ axis even at zero forward velocity due to the spinning flywheel, the monowheel's forward velocity must be nonzero ($\dot{x} > 0$) in order for the GC to have a chance to move out from under the CG and produce a torque to correct the lean.

At intermediate velocities, with a COM (center of mass) far from GC, the vehicle can control roll by navigating a serpentine rather than a straight line trajectory in $\hat{x}$ which is a common technique when riding a unicycle. This results in an oscillating θ and correcting torques generated by centripetal acceleration in each turn.

$$\tau_{inertial} = (Mr_t\dot{\gamma}^2)l = Ml\left(\frac{\dot{x}}{\dot{\gamma}}\right)\dot{\gamma}^2 = Ml\dot{x}\dot{y}$$

Dynamic Balance (YZ plane) at Zero Forward Velocity:

At low velocity, $\dot{x} \approx 0$, tilt balance can be maintained even if the body at times is instantaneously not in a state of static balance.

Strategies:

The preferred embodiment of the vehicle uses torque against a reaction wheel (the flywheels) to provide balance, especially at low or zero vehicle velocities. This is analogous to a tight rope walker with balance pole. The balance pole, although light-weight, represents a much larger rotational inertia than the tight rope walker himself and provides a reaction inertia. Addition of the large balance pole inertia to his own also substantially reduces his own tipping frequency and thus provides more reaction time. Torques about the axis of the tight rope can be generated by accelerations of the balance pole reaction inertia in the opposite direction. Since the tight rope walker is nominally erect (i.e., oriented parallel to the gravity vector, otherwise he'd fall), the practical range of angles of the pole (relative to horizontal) is limited, and similarly, the achievable correcting torques remain small.

Large torques are possible by braking, but as this is a continuous process, you can't continuously brake although short term braking is practical for impulse corrections. As a result, a large torque actuator (flywheel) would be required and may not be efficient unless the energy could be reharvested.

$$\tau_{reaction} = \frac{d}{dt}(J_{rw}\omega_{rw}) = J_{rw}\frac{d}{dt}\omega_{rw}$$

The limitation requiring a respectable nonzero forward velocity of a wheel as a gyroscope can be overcome by mounting the flywheel onto a pivot as indicated in FIG. 5. Rotation or precessing of the flywheel's axis about the $\psi$ axis results in a torque about the $\hat{x}$ axis even at zero forward velocity ($\dot{x}=0$):

$$\tau_{\hat{x}} = J_f \omega_f \dot{\psi} \cos(\omega - \gamma)$$

where $\psi$ is the deflection of the pivot in inertial coordinates. Then, including the effect of the preferred gyroscopic actuator in the simplified vehicle roll dynamics:

$$J_{GC}\ddot{\theta} - Mgl\theta = -J_f\omega_f\dot{\psi}\cos(\psi-\gamma)$$

A control law can be applied to servo this twisting motion about $\psi$ to correct vehicle lean. This situation sounds promising when traversing straight trajectories but, in turns, the turns themselves create a yawing motion with respect to inertial space that would create undesirable gyroscopic effects if only a single flywheel were employed, resulting in turns in one direction to be easier and in the other direction much more difficult. To null this side effect, a pair of counter rotating (in both spin and twist) gyroscopic actuator assemblies (flywheel assemblies) with equal rotational inertias should be employed.

Like the unicycle rider balancing in the fore-aft direction, dynamic balance can be maintained with a hysteresis or limit cycle motion wherein the body continuously oscillates about $\theta=0$. We say it is dynamic because at almost any instant in time, the body may be instantaneously unstable, but net stable over time maintaining balance. If the dominant mass is a necessary system component like the wheel motor or batteries/fuel cell, a mechanical oscillator between it and a spring can be used, with a smaller actuator that excites it at this frequency. With a preferentially series elastic actuator (see U.S. Pat. No. 5,650,704) a control scheme that adjusts the neutral position can be employed. The optimal natural frequency of this system should be much higher than (or match) the tipping frequency. In this case, the physical body doesn't actually rotate substantially. When moving, locking the actuator (say, by shorting the leads) prevents inadvertent excitation that might occur if the spatial frequency of bumps and forward speed are such that this frequency is excited. Preferentially, it would be desirable to design it as a dynamic absorber system so that there are no lateral forces at GC.

A monowheel with an omnidirectional wheel could employ passive stability in the X-Z plane and dynamic balance in the Y-Z plane much the same what the unicycle rider does at zero velocity and leverage gyroscopic effect of the wheel at speed. The omnidirectional wheel could also provide a means of instituting "lean" by moving the GC out from underneath the COM. It could also provide a means of turning at zero forward velocity since it would have two GC points on adjacent mini-wheels that could rotate in opposite directions. All the mini wheels could be powered off of a single actuator with alternating wheels rotating in opposite directions. If the transmission ratio of the wheels spinning in one direction was different from the other then a single actuator could cause a "hovering" motion to move the GC with respect to the COM to balance laterally albeit with a slight simultaneous but tolerable yaw motion.

An alternative means of balancing at low forward velocity is to provide a means of oscillating the vehicle in the $\hat{z}$ direction close to the ground contact. This situation is a variant of the inverted pendulum problem and has been solved for the case where the oscillation is a simple harmonic motion ($z(t) = Ae^{i\omega t}$).

$$J_{GC}\ddot{\theta} - Mgl\sin\theta = \ddot{z}\sin\theta = -MlA\omega^2 e^{i\omega t}\sin\theta$$

For sufficiently fast oscillations, although the vehicle roll, $\theta(t)$, deviates from zero, it recovers in a type of limit cycle solution and balance is maintained. Note that such a scheme doesn't require feedback or control to achieve this effect. It does, however, require that the oscillation be largely and consistently in the $\hat{z}$ direction.

Note that all of these strategies for balance in the roll direction are distinct from the notions of balance in the Dean Kamen patents related to the Segway™ (U.S. Pat. Nos. 5,975,225, 6,357,544, and 6,367,817). In the vehicles described in those patents, the vehicles are statically stable in the roll direction by virtue of having widely separated wheels. However, they are unstable in the pitch direction and apply the known solution to the inverted pendulum control problem to "balance" in the pitch direction. Fundamentally, such balance couples the position of the vehicle and its pitch. Put simply, the vehicle must move forward or backward somewhat to correct for a deviation in vehicle pitch. This can be intuitively understood by appreciating that balancing an inverted broom on one's palm is a classic example of the inverted pendulum control problem. In contrast, the monowheel vehicle that is the subject of this invention cannot simply move sideways to correct for vehicle lean in the roll direction due to the no-slip or limited slip condition presented by the wheels at the ground contact.

Dynamic Balance (YZ plane) at Non-Zero Forward Velocity:

Although the nominal desired lean angle (tilt) at zero forward velocity will typically be zero because it represents an equilibrium point, it will be nonzero at higher speeds. In a turn ($\dot{x} \neq 0$ and $\dot{\gamma} \neq 0$), although the body may be experiencing substantial lean ($\theta \gg 0$), inertial forces due to centripetal acceleration generates a torque about the CG. As a result, the equilibrium point is moved to a nonzero position wherein the inertial torque balances the weight-induced torque. Assuming the center of mass is elevated above and separated from the GC by a distance 1, a torque is generated outwards from the circle of radius, r, with a magnitude:

$$\tau_{inertial} = (Mr_t \dot{\gamma}^2) l = Ml \left( \frac{\dot{x}}{\dot{\gamma}} \right) \dot{\gamma}^2 = Ml\dot{x}\dot{\gamma}.$$

Then $$\tau_{inertial} = \tau_{weight}$$

$$Ml\dot{x}\dot{\gamma} = Mgl\sin\theta,$$

resulting in a new equilibrium lean angle of $$\theta = \sin^{-1}\left( \frac{\dot{x}\dot{\gamma}}{g} \right).$$

As a sanity check, this dynamic result should still be valid in the static case of $\dot{x}=0$ and $\dot{\gamma}=0$, indeed $\theta=0$. Thus, this value represents the nominal equilibrium and therefore, the typical desired lean angle as a function of both forward speed and yaw rate.

Righting the Vehicle from a Fallen Pose:

There are numerous motivations to consider the case of the vehicle in a prone position with its wheels not in contact with the ground. Beyond the obvious that it should be inevitable that the vehicle would eventually end up in this position unintentionally, intentional motivations might be to conserve power in this minimum potential energy state or simply to make it easier to hide.

In order to right the fallen tandem monowheel vehicle, a means must be found to exert a torque about the body. External forces can be created by use of actuators or thrusters. Internal forces can be created by reacting against a reaction inertia (quasi-static case) or precessing a gyroscope by leveraging Newton's third law roughly stated that for every action there is an equal and opposite reaction.

Figure 7:
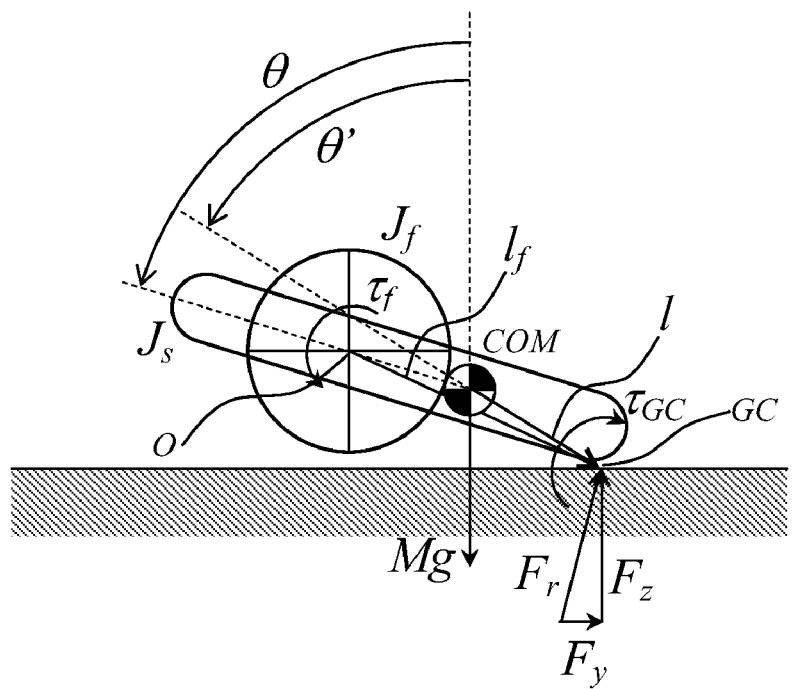
FIG. 7 illustrates torques for righting a fallen vehicle.

For the large torques required to right the fallen vehicle, then a different dynamic case must be employed. Consider FIG. 7, which illustrates the torques involved in righting the fallen vehicle. Here, a monowheel has fallen over onto its side with a tilt of $\theta$ and the situation is viewed looking at the XY plane. The wheel(s) contact the ground at a point referred to as the ground contact (GC). If the wheel is infinitesimally thin, then $\theta$ and $\theta'$ are the same. Otherwise, due to the finite profile of the tire in the XY plane, $\theta'$ represents the angle between 1, the distance separating the COM and the GC, and the vertical. The vehicle dynamics have been simplified to that of a rotational inertia, $J_s$, whose axis of rotation is in the $\hat{x}$ direction.

Figure 8:
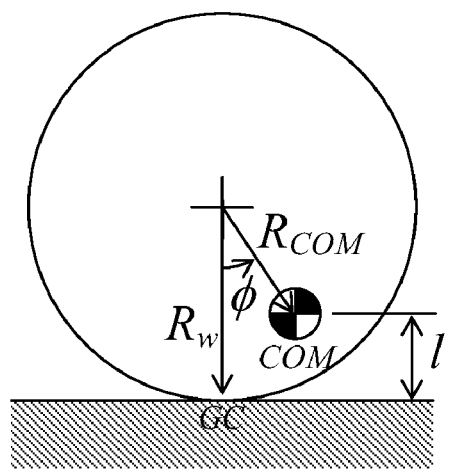
FIG. 8 describes the geometry behind the distance separating the COM (center of mass) and the GC (ground contact) as a function of the instantaneous pitch.

FIG. 8 describes the geometry behind the distance separating the COM (center of mass) and the GC (ground contact) as a function of the instantaneous pitch. The distance from the COM to the GC, used in many calculations herein, l, is $$l = R_w - R_{COM} \cos\phi.$$

In order to right the vehicle, a torque about the GC needs to be created. For the general case, this torque can only be manifested as an external torque to the monowheel structure. However, application of this torque between a reaction inertia, $J_f$, and the monowheel structure, $J_s$, allows this torque to be applied as an internal torque resulting in acceleration of both inertias albeit in opposite directions with a resultant force, $F_r$, by the ground on the GC and a component, $F_y$, in the $\hat{y}$ direction resisting slip.

Summing torques around the GC yields:

$$(J_s + Ml^2 + J_f)\ddot{\theta} = J_{GC}\ddot{\theta} = \sum_{i=1}^{n} \tau_n = Mgl\sin\theta + \tau$$

where $J_{GC}$ is the net effective rotational inertia about the ground contact. From the above, we see that if the dynamics are reduced to zero, then the external torque, $\tau_{GC}$, is simply equal to the weight-induced torque which matches intuition. Rearranging results in:

$$\tau = J_{GC}\ddot{\theta} - Mgl\sin\theta$$

Based on the above result, it can be determined that if the acceleration of the body about $\theta$ is ignored, then the torque generated by the time rate of change of the flywheel inertia would reduce to that necessary to counter only the weight-induced torque which is the static value. Thus, it's no surprise that $\ddot{\theta}=0$. A larger rate than this is necessary to produce acceleration of the body in the negative direction ($\ddot{\theta}<0$). So then, what is that acceleration? We seek the acceleration that would restore $\theta=0$ with $\dot{\theta}=0$. From energy conservation between states:

$$E_{tot} = \sum_{i=1}^{n} E_n = \frac{1}{2}J_f\omega^2 + \frac{1}{2}J_{GC}\dot{\theta}^2 + Mgl\sin\theta \text{ where } \frac{d}{dt}E_{tot} = 0.$$

Then, if the body could be instantaneously accelerated to a rotational velocity, $\dot{\theta}$, and all of that energy was translated into gravitational potential energy and all other stored energy such as in the flywheel in the system remained constant, comparing the final desired state ($\theta=0$ and $\dot{\theta}=0$) to an initial state ($\theta \neq 0$ and $\dot{\theta} \neq 0$) evaluated at $t=0^+$ yields:

$$\left( \frac{1}{2}J_{GC}\dot{\theta}^2 \right)_{initial} = (Mg\Delta g)_{final} = Mgl(1 - \cos\theta_{initial}).$$

Note that although this is mathematically valid for all $\theta$, it is likely impractical much beyond $\theta = \pi/2$ as it is imperative that the no lateral slip condition be maintained. Solving yields:

$$\dot{\theta}_{initial} = \sqrt{\frac{2Mgl(1 - \cos\theta_{initial})}{J_{GC}}}$$

Note that although calculated instantaneously, since the trajectory of $\theta$ is continuous to the end condition, this expression is also a valid description of $\dot{\theta}(t)$ as a function of $\theta(t)$ although it is not a unique trajectory satisfying the beginning and ending conditions. Differentiating both sides with respect to time gives:

$$\ddot{\theta}_{initial} = \frac{Mgl}{J_{GC}} \sin\theta_{initial}.$$

Inserting this result into the equation above and dropping the "initial" subscript provides an expression for the necessary torque:

$$\tau = 2Mgl \sin\theta.$$

It is interesting to note that this expression simplifies so much. Based on the equations and assuming no losses, the necessary input is to simply provide double the weight-induced torque. It may not be intuitive that the result doesn't depend on $J_{GC}$, but if one considers that although the input should be linearly larger for a larger body rotational inertia, the stored kinetic energy also increases linearly with this parameter and cancel.

If the torque, $\tau$, comes from a reaction inertia, then:

$$\tau = -J_f \frac{d}{dt}\omega_f$$

Therefore, $$\frac{d}{dt}\omega < 0,$$

meaning that the flywheel must decelerate or accelerate in the opposite direction to θ. Due to energetic limitations, it is typically more practical to brake the flywheel rapidly than to accelerate rapidly. For the tandem monowheel, reaction inertias exist in the form of the two flywheels when oriented such that their spin axes are parallel to $\hat{x}$ or $|\psi-\gamma|=\pi/2$. Or, in other words, for establishing an optimal orientation of the flywheels prior to righting the vehicle (prior to braking the flywheels), the flywheels' spin axes are perpendicular to the diameters of the wheels (and parallel to the roll axis). In this configuration, the angular momentum of the flywheels is parallel to the roll axis. The two flywheel pivots can be subsequently reoriented and their respective flywheels spun up to speed.

Using the dynamic method, there are three candidate trajectories for righting the system:

1. A simple rotation about GC to the upright position.

2. A dynamic rotation about GC beyond the upright position such that the GC or "foot", or current contact point with the ground (as it is a locus of moving contact), leaves the ground, resulting in an airborne or aerial phase. This "hop" is recovered by appropriate foot placement to absorb the lateral translational kinetic energy.

3. A simple rotation about the GC to a somewhat elevated position and then accelerating forward along a circular or spiral trajectory.

Figure 9:
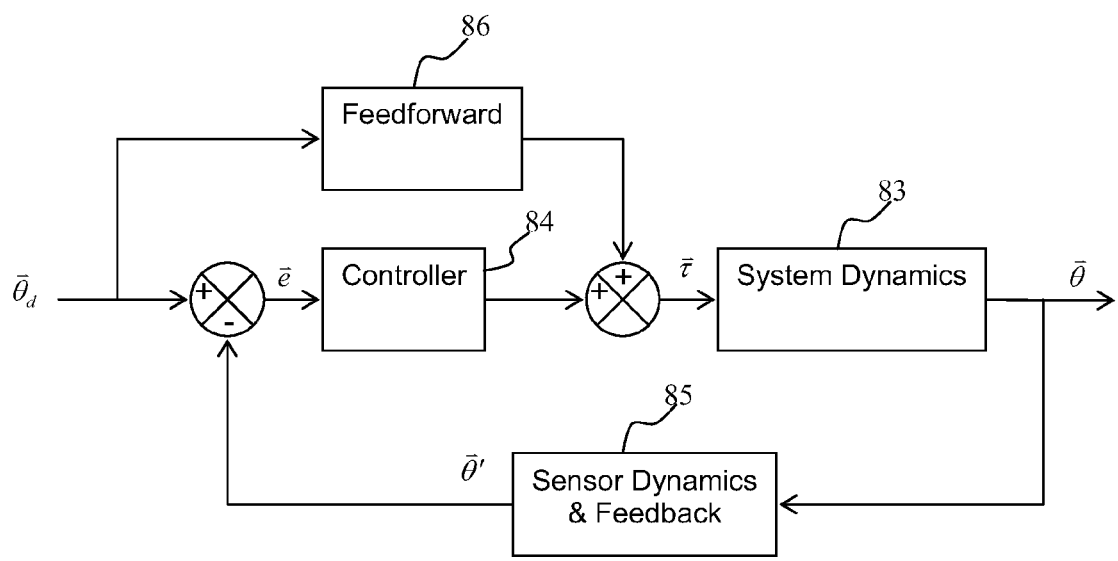
FIG. 9 illustrates a control system for balancing and uprighting the vehicle.

For trajectory following with the simple rotation method #1, a controller such as shown in FIG. 9 can be used as a proportional-plus-derivative controller of the form:

$$\tau_f = K_{P\theta}(\theta_d - \theta) + K_{D\theta}(\dot{\theta}_d - \dot{\theta}) = K_{P\theta}e + K_{D\theta}\dot{e}$$

For $\theta_d = \dot{\theta}_d = 0$ and evaluating at $\theta = \pi/2$, this suggests:

$$\tau_f = 2Mgl\frac{2\theta}{\pi} - K_D\dot{\theta}$$

In the context of the control system diagram of FIG. 9, the first term above represents an open loop torque that would be applied in the feedforward control block and the second term represents a rate feedback that would be applied in the feedback control block.

FIG. 9 represents a generalized control system diagram for the monowheel. The vehicle state variables such as position, forward velocity, roll angle, pitch angle, flywheel speed, gyroscope orientation, etc. are represented by the vector, $\vec{\theta}$. The vector of desired states is represented by $\vec{\theta}_d$. The state variables as observed by the vehicles sensors and modified by the controller are represented by the vector, $\vec{\theta}'$. The vector of actuator inputs (torques, positions, velocities, fuel flow, transmission speed selection, etc., depending on the type of vehicle actuator) is $\vec{\tau}$. The vehicle control system includes the system dynamics 83 of the vehicle, a controller block 84 that operates on the error vector (the difference between desired and actual vehicle state variable values), a sensor dynamics and feedback block 85 that includes sensor dynamics as well as control that operates only on the actual state variable values, and a feedforward block 86 that operates only on the desired state variable values or none at all and is often referred to as "open loop" control.

For the dynamic method #2, an open loop torque can be supplied initially as long as a closed loop method can be employed during ballistic flight. Although energetically suboptimal, since there is precedence for "foot placement" during the ballistic phase in the literature (Raibert, M. H., Brown, H. B., Jr. 1984. Experiments in balance with a 2D one-legged hopping machine. ASME J. Dynamic Systems, Measurement, and Control 106:75-81), this seemingly more complicated method may actually be easier from a control perspective. For $\theta \leq \pi/2$, such an open loop torque can be simply:

$$\tau_f = 2K_O Mgl \sin\theta,$$

for $K_O > 1$.

During the ballistic phase, the GC is placed such that it is laterally farther away from the COM as the lateral velocity increases. Unlike the robots in the Raibert papers which were specifically designed such that the rotational inertia of the legs was much smaller than that of the reaction inertia "body," for the tandem monowheel, the rotational inertia in the roll direction is much larger than the flywheel. As such, conservation of angular momentum in the ballistic phase must be considered in order to accurately place the GC. Therefore, it is desirable to incorporate two flywheels: the first as described previously, and a second rotating in the opposite direction, that operates at constant angular velocity during the "leap" and rapidly decelerates during the ballistic phase to cause a rotation of the structure in the opposite direction for GC placement.

For the dynamic method #3, if ground space permits, one way to use smaller torques and still right the vehicle is to separate the righting process into the following sequence combining a static step with a dynamic step. Firstly, apply an initial torque to tilt the vehicle up enough to allow the body to clear the ground and the wheel to contact the ground with sufficient contact pressure so as to not slip laterally. Subsequently, negotiate a circle, leveraging inertial forces due to centripetal acceleration to cause a rotation of the body (assuming the center of mass is elevated above and separated from the GC by a distance l) outwards from the circle:

$$\tau_{inertial} = (Mr_t\dot{\gamma}^2)l = Ml\left(\frac{\dot{x}}{\dot{\gamma}}\right)\dot{\gamma}^2 = Ml\dot{x}\dot{\gamma}$$

where r is the radius of the circle, $\dot{\gamma}$ is the angular frequency, and $\dot{x}$ is the speed. Additionally, the vehicle can accelerate and negotiate a spiral trajectory of ever decreasing radius to hasten the effect:

$$\frac{d}{dt}\tau_{inertial} = Ml(\dot{x}\dot{\gamma} + \ddot{x}\gamma)$$

Note that since the first action preferentially exerts a torque on a vehicle of low rotational inertia, it would be preferential for the vehicle to possess the ability to move its center of mass such that it is close to the GC in the first action and farther from it in the second action. If so, then $$\frac{d}{dt}\tau_{inertial} = M\left(\dot{l}\dot{x}\dot{\gamma} + l\ddot{x}\dot{\gamma} + l\dot{x}\ddot{\gamma}\right)$$

From this differential description of the torque, we can see that the inertial torque increases with acceleration ($\ddot{x}>0$), a decreasing radius ($\ddot{\gamma}>0$), and increasing COM-GC separation distance ($\dot{l}>0$). Similarly, based on this equation, there is a means of reducing the torque as the vehicle is righted, namely by deceleration and by increasing the trajectory radius. Once the body is sufficiently upright, the balance control system can take over and the circular or spiral trajectory can be aborted.

Vehicle Acceleration:

In conventional monowheel systems, excessive acceleration or deceleration results in the structure of the vehicle spinning in the opposite direction due to coupling of the wheel actuation and pitch attitude control. This condition is colloquially known as "gerbiling." An analysis of the dynamics of the structure in rotation yields:

$$J_s\ddot{\varphi} = \sum_{i=1}^n \tau_n = -Mgr\sin\varphi - \tau_w = -Mgr\sin\varphi - (J_w + MR^2)\dot{\omega}_w$$

If the wheel torque, $\tau_w$, exceeds the weight-induced torque, Mgr sin φ, then the rotational inertia of the structure accelerates. If it exceeds the maximum value of Mgr, then the structure spins. This result also illustrates how the maximum wheel torque used to accelerate a conventional monowheel vehicle cannot exceed the critical value of $$|\ddot{\varphi}|_{max} = \frac{Mgr}{J_s}$$

without causing the "gerbiling" condition. Note that even if this condition is satisfied, the pitch may still be nonzero and have a maximum magnitude of $|\varphi|\leq\pi/2$.

Fundamentally, the problems of coupled pitch to wheel acceleration and the possibility of "gerbiling" occur because the vehicle structure is the only reaction inertia available.

Alternatively, a design solution to this problem can be found by providing an alternative reaction inertia preferably with an axis in the $\hat{y}$ direction that is free to accelerate or decelerate in the opposite direction. If this reaction inertia has its center of mass at its center of rotation such as in a flywheel, then no gravitational potential energy is stored and the dynamics of the system become:

$$J_s\ddot{\varphi} = \sum_{i=1}^n \tau_n$$
$$= -Mgr\sin\varphi - (\tau_w + \tau_f)$$
$$= -Mgr\sin\varphi - ((J_w + MR^2)\dot{\omega}_w + J_f\dot{\omega}_f\cos(\psi - \gamma))$$

where the flywheel kinematics have been simplified for the nominal case of θ≈0 and φ≈0.

This expression clearly demonstrates that if the pitch is in the vicinity of its nominal value of φ=0 and |ψ−γ|=0, then if $$\tau_f = -\tau_w,$$

then there will be no net acceleration on the structure ($\ddot{\varphi}=0$). Thus, if $$J_w + MR^2 = KJ_f,$$

then the desired flywheel accelerations should be:

$$\dot{\omega}_f = -K\dot{\omega}_w$$

Moreover, if the flywheel is gimbaled so that it can pivot, then an additional, gyroscopic term can be added for an additional degree of control:

$$J_s\ddot{\varphi} = -Mgr\sin\varphi - ((J_w + MR^2)\dot{\omega}_w + J_f\dot{\omega}_f\cos(\psi-\gamma) + J_f\omega_f\dot{\psi}\cos(\psi-\gamma)).$$

Thus, the pitch of the structure can be modulated both by accelerating or decelerating the flywheels as long a sufficient component of the momentum is along the $\hat{y}$ axis or by precessing the gyroscopes about the $\dot{\psi}$ axis, or by a combination of both control inputs. For example, in order to maintain the current pitch, then $\ddot{\varphi}=0$. Thus:

$$J_f\dot{\omega}_f\cos(\psi-\gamma) + J_f\omega_f\dot{\psi}\cos(\psi-\gamma) = -(Mgr\sin\varphi + (J_w + MR^2)\dot{\omega}_w)$$

$$[J_f\cos(\psi-\gamma)\,J_f\omega_f\cos(\psi-\gamma)]\begin{bmatrix}\dot{\omega}_f\\\dot{\psi}\end{bmatrix} \approx [-Mgr - (J_w+MR^2)]\begin{bmatrix}\varphi\\\dot{\omega}_w\end{bmatrix}$$

As a result, the present pitch attitude, φ, can be maintained in the presence of wheel acceleration, $\dot{\omega}_w$, given the present orientation of the flywheel in inertial coordinates, ψ−γ, by a combination of flywheel speed change, $\dot{\omega}_f$, and orientation change, $\dot{\psi}$.

A single actuator can be used to torque both inertias to reduce the number of actuators although double the torque will be required. Alternatively, if the torques are supplied by separate actuators, or if the flywheel or the wheel or both is/are coupled to a single actuator with a variable transmission, then the net torque, i.e., the difference in applied torques can be used to servo a somewhat arbitrary pitch angle.

$$\tau_w - \tau_f = K_{P\varphi}(\varphi_d - \varphi) - K_{D\varphi}\dot{\varphi}$$

Alternatively, a gyroscope with a pivoting axis oriented vertically and a spin axis oriented along the $\hat{x}$ axis can be twisted along the pivot axis to produce a reaction torque to resist the vehicle structure from gerbiling. Gyroscope arrangements with alternative axis orientations are possible that will achieve the same effect as long as the precession axis is along the ŷ axis. In another embodiment, the flywheel axes are mounted on a gimbal that can changes the angles of the axes in multiple dimensions, rather than the axes only being pivoted generally about a vertical axis.

Raising the Center of Mass (COM):

In conventional monowheeled vehicles, it is undesirable for the pitch to exceed a value even close to π/2 to avoid upsetting the rider. However, in an unmanned monowheel vehicle, it may be desirable to do so since there are two solutions to the weight-induced torque for |φ|≦π. The solution with the larger angle might be desired in order to increase the distance between the COM and the GC, for example, or to decrease the tipping frequency.

Generalized Vehicle Control Strategy:

Up to now, we have discussed how gyroscopic actuators (flywheels) could be used to correct tilt about the x̂ axis and control pitch including resisting vehicle structure acceleration about the ŷ axis. Also, in a simplistic case it was mentioned that the two actuators should generally always act opposite each other. However, that isn't necessarily optimal. For example, with a pair of gyroscopic actuators, there are four input variables (front flywheel spin speed change and precession speed, and rear flywheel spin speed change and precession speed) to contribute to servoing the net desired torque vector which is a sum of the desired roll, pitch, and yaw torques:

$$\vec{\tau}_{tot} = \vec{\tau}_{\hat{x}} + \vec{\tau}_{\hat{y}} + \vec{\tau}_{\hat{z}}$$

For the purpose of illustration, the desired yaw torque can be extracted to allow focus on the desired roll and pitch torques. As a result, solutions can be chosen such that the sum of the gyroscopic torques introduced by the precession speeds equals the desired roll torque and the difference equals the pitch torque:

$$\begin{bmatrix} \tau_{\hat{x}} \\ \tau_{\hat{y}} \end{bmatrix} = \begin{bmatrix} J_f \cos(\psi_1 - \gamma) & J_f \cos(\psi_2 - \gamma) \\ J_f \cos(\psi_1 - \gamma) & -J_f \cos(\psi_2 - \gamma) \end{bmatrix} \begin{bmatrix} \dot{\psi}_1 \\ -\dot{\psi}_2 \end{bmatrix}$$

One can see that if the desired pitch torque is zero, then indeed, the amount of necessary precession speed of both gyroscopic actuators is the same. One skilled in the art can appreciate that other combinations of the four gyroscopic actuator control variables are conceivable.

A generalized vehicle control strategy that seeks to simplify control by largely decoupling these variables might proceed according to the following logic:

At low speeds when both wheels maintain traction, control Yaw attitude (steer) using the steering motor to actuate the active differential input, differential bevel gear 72.

Roll attitude by equally precessing the gyroscopic actuators as needed. Nominal roll angle should generally be the equilibrium lean angle and be zero. The profiled tires with the minimum gravitational potential energy state at zero lean angle will provide a degree of passive stability.

Pitch attitude will be maintained statically by the center of gravity below the axis of rotation and at low accelerations by having the combined wheel rotational inertia less than 30% of the structure rotational inertia.

Forward speed with the internal combustion engine throttle control.

At higher speeds, lock the differential by preventing the differential bevel gear 72 from rotating by servoing the current position (zero angular velocity) of the steering motor.

Yaw attitude (steer) by adjusting the equilibrium lean angle off of zero to introduce intentional lean into the direction of the desired turn and roll velocity to introduce a gyroscopic yaw torque.

Roll and pitch attitude primarily by precessing the gyroscopic actuators. During rapid acceleration, decelerate one of the flywheels to servo pitch. Conversely, during rapid deceleration, accelerate one of the flywheels to maintain constant angular momentum in the ŷ direction. By conservation of angular momentum, this flywheel speed change will require virtually no power.

Forward speed with the internal combustion engine throttle control.

Preferential Dynamics and Additional Analysis:

Once righted, in the simplest case with no momentum components spinning about the ŷ axis, summing torques around the GC yields the following dynamic relationship:

$$J_{GC}\ddot{\theta} = \sum_{i=1}^{n} \tau_n = -Mgl\sin\theta \approx -Mgl\theta$$

Then $$J_{GC}\ddot{\theta} + Mgl\theta = J\ddot{\theta} + K_\theta \theta = 0.$$

This yields an expression for the "tipping frequency" exhibited by the vehicle:

$$f_t = \frac{1}{2\pi}\sqrt{\frac{K_\theta}{J}} = \frac{1}{2\pi}\sqrt{\frac{Mgl}{J_{GC}}},$$

where M is the total vehicle mass, l is the distance from the ground contact (GC) to the vehicle's center of mass and $J_{GC}$ is the total mass moment of inertia about the GC. Thus, for improved roll control to resist tipping, it is preferable to have the vehicle rotational inertia as large as possible.

Speed Control:

The wheel torque should be controlled depending on the mode desired. If in a position control mode with a constant destination position, $x_d$, then a candidate control law may take the form of a regulator:

$$\tau_w = K_{Px}(x_d - x) - K_{Dx}\dot{x} + K_{Ix}\int(x_d - x)dt$$

where $\dot{x} = \omega_w R$.

If in a velocity control mode with a constant desired velocity, $\dot{x}_d$, then a candidate control law may be:

$$\tau_w = K_{Pv}(\dot{x}_d - \dot{x}) - K_{Dv}\ddot{x}$$

Alternatively, a controller that takes both speed and position into account can be considered as independent state variables.

Figure 10:
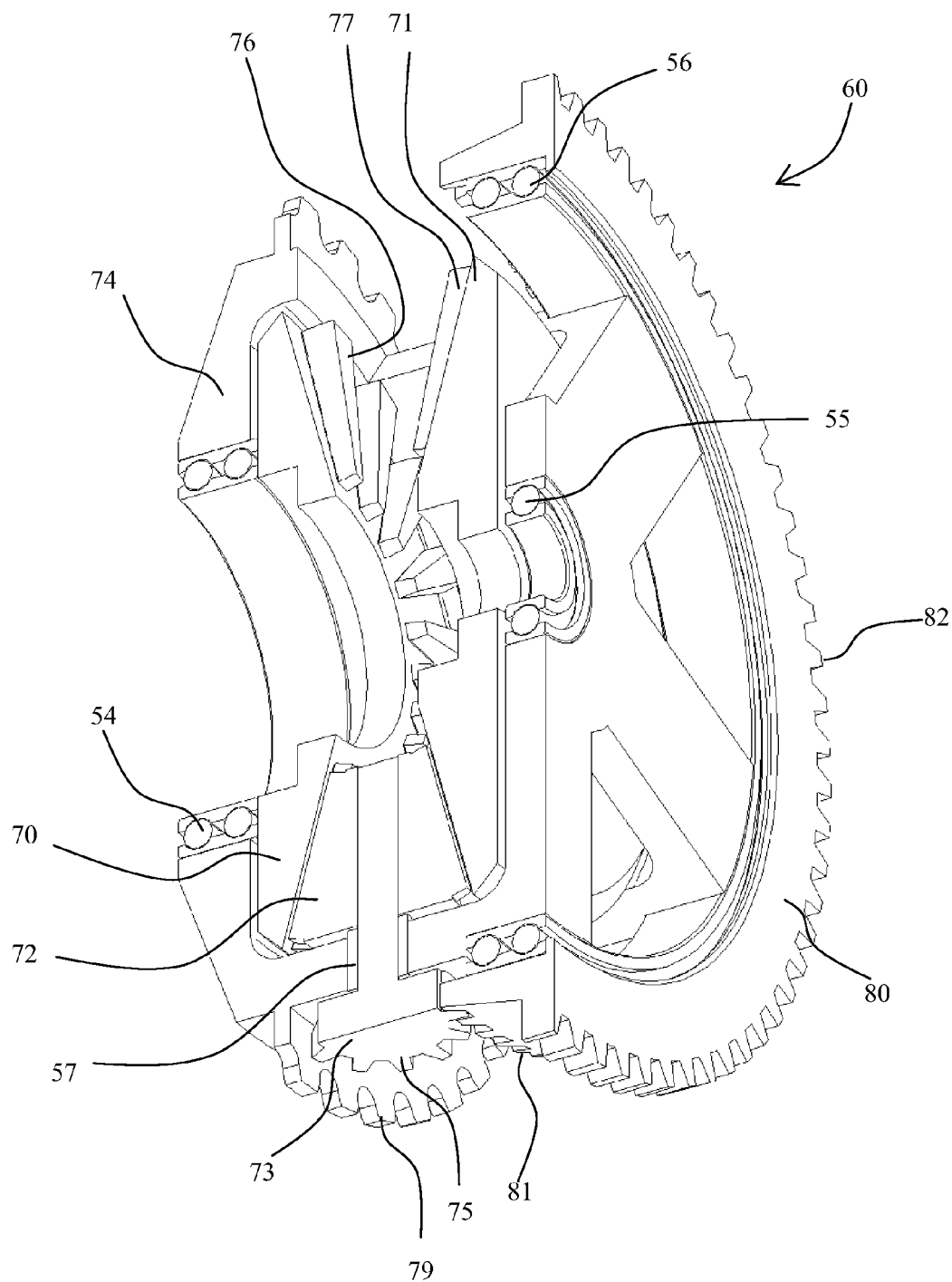
FIG. 10 is a perspective cross-sectional view of the differential transmission assembly.
Figure 11A:
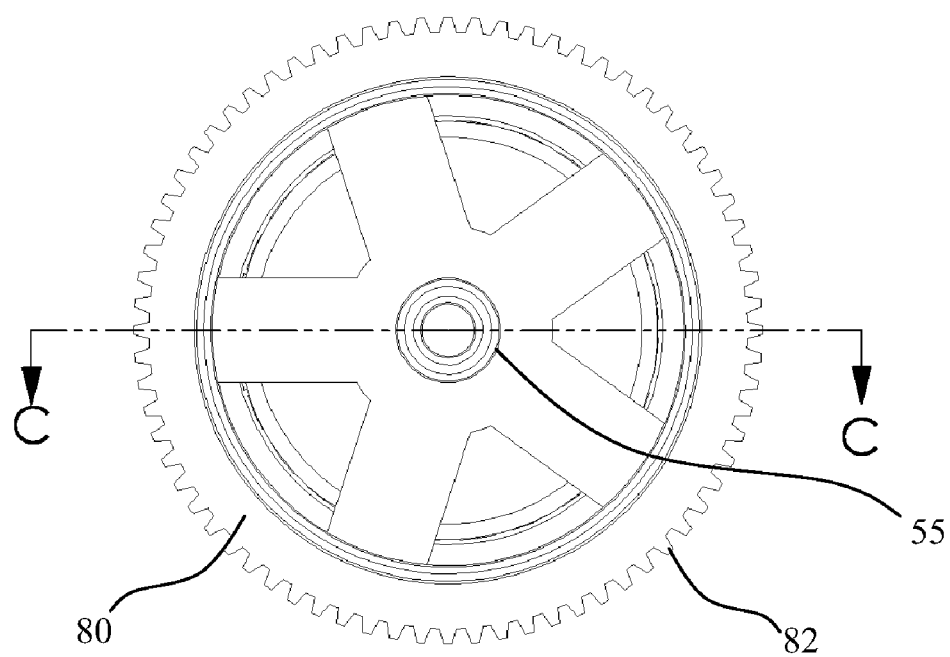
FIG. 11A is a side view of the steering ring gear perpendicular to the wheel axes. The steering gear is also shown in FIGS. 2, 3A, and 10, among others.
Figure 11B:
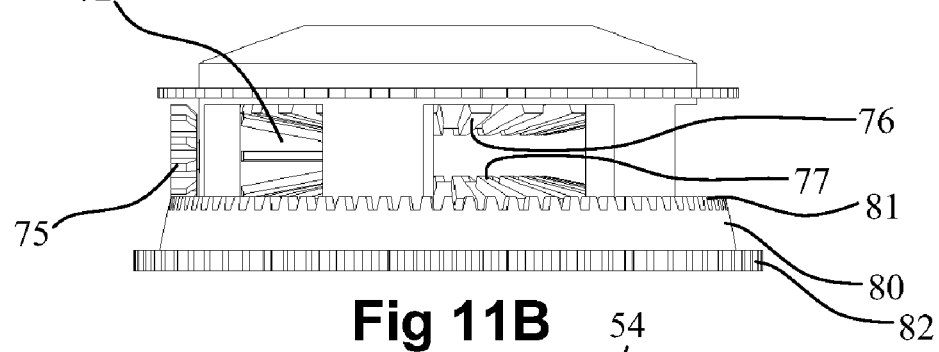
FIG. 11B is a top down view of the differential transmission assembly.
Figure 11C:
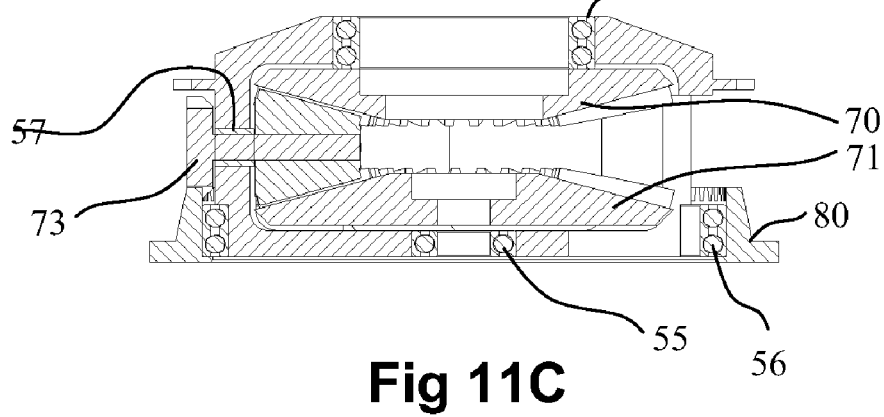
FIG. 11C is a top down cross-sectional view of the differential transmission assembly along the line C-C in FIG. 11A.

Differential Transmission Assembly:

The vehicle employs a differential transmission assembly 60 to supply power from the internal combustion engine and transmission assembly 30 to the two wheels 2 and 4, much like in a rear wheel drive automobile. FIGS. 10 and 11 illustrate the differential transmission assembly.

The drive sprocket 31 (FIG. 2) from the internal combustion engine and transmission assembly 30 drives a differential ring gear/carrier 74 via a drive chain 33 (FIG. 2) engaging with differential ring gear/carrier sprocket teeth 79. Rotation of the differential ring gear/carrier 74 also rotates the left wheel differential transmission bevel gear 70, attached to the left wheel axle 6, to rotate the left wheel 2, and rotates the right wheel differential transmission bevel gear 71, attached to the right wheel axle 7, to rotate the right wheel 4. A differential bevel gear 72 engages the left wheel differential transmission bevel gear teeth 76 and the right wheel differential transmission bevel gear teeth 77 to couple the left wheel differential transmission bevel gear 70 to the right wheel differential transmission bevel gear 71. The differential bevel gear 72 moves with the differential ring gear/carrier 74 and maintains engagement with the bevel gears 70 and 71 but also allows the bevel gears 70 and 71 to turn at different speeds when one wheel experiences resistance due to ground contact when the vehicle turns. The differential transmission assembly splits the input torque between the two wheels 2 and 4 and allows the wheels to rotate at different speeds. This aspect of the differential transmission assembly is a passive differential.

The differential transmission assembly also includes an active differential gear assembly that is used for steering the vehicle at zero or low forward velocities (rather than tilting the vehicle when moving). A differential pinion gear 73 extends from the differential bevel gear 72 and has differential pinion gear teeth 75 that engages with steering crown gear teeth 81 of a steering ring gear 80. A steering motor 40 (FIG. 2) supplies torque, through a steering clutch 41, to a steering drive gear 42 which, in turn, engages the steering ring gear outer teeth 82 of the steering ring gear 80. Rotation of the steering ring gear 80 by the steering motor 40 causes a rotation of the differential pinion gear 73, through the meshing of teeth 81 and the differential pinion gear 75 teeth, to cause the wheels to move oppositely by causing the bevel gears 70 and 71 to move oppositely. At zero forward velocity, the wheels 2 and 4 will move in opposite directions when the steering motor 40 and steering clutch 41 are activated to redirect the vehicle. When the steering motor 40 is not used, the steering clutch 41 disengages the steering motor 40 from the steering drive gear 42.

When the vehicle is moving in a forward direction, the differential pinion gear 73 rotates around the wheel axes as a result of being engaged with the rotating bevel gears 70 and 71. Since the steering motor 40 is typically disengaged from the differential pinion gear 73 when the vehicle is moving in a forward direction, there is little drag on the propulsion system due to the steering assembly.

The various gears use the following bearings: differential ring gear/carrier inner bearing 54, differential ring gear/carrier outer bearing 55, steering ring gear bearing 56, and pinion gear bearing 57.

Thus, the drive torque, $\tau_D$, to the left and right wheels 2 and 4 (for propulsion) is the scaled sum of the torques to the left and right wheels, $\tau_L$ and $\tau_R$, respectively. Also, the steering torque, $\tau_S$, is the scaled difference of the torques to the two wheels:

$$\begin{bmatrix} \tau_D \\ \tau_S \end{bmatrix} = \begin{bmatrix} k_1 & k_1 \\ k_2 & -k_2 \end{bmatrix} \begin{bmatrix} \tau_L \\ \tau_R \end{bmatrix} = K \begin{bmatrix} \tau_L \\ \tau_R \end{bmatrix}$$

Thus, the wheel torques can be expressed as:

$$\begin{bmatrix} \tau_L \\ \tau_R \end{bmatrix} = K^{-1} \begin{bmatrix} \tau_D \\ \tau_S \end{bmatrix}.$$

This entire differential assembly may be sealed and contain a viscous fluid and appropriate features to operate as a viscous coupling unit such that slow, relative motions of the two outputs are permitted, yet suppress rapid rotations as might occur during the case of a single wheel spinning. Although all gears in these figures are shown with straight cut teeth, one skilled in the art can appreciate that they may be cut other ways as well such as helical and double helical.

The various electronic controls and attitude sensors (e.g., inclinometers, gyroscopes including both spinning type and vibrating structure type, accelerometers, GPS triangulation receivers, etc.) are provided on an upper platform 21 (FIG. 2). Such devices may be conventional and are well known. Such devices include a power supply unit 22, a CPU and input-output electronics 23 (including all sensors), and motor current amplifiers and drive electronics 24. The CPU controls the balancing system until the actual vehicle roll, pitch, and yaw match a desired roll, pitch, and yaw needed to keep the vehicle balanced with the desired pitch configuration and heading. The CPU may also control the speed of the vehicle. A speed sensor may include a GPS sensor or a sensor directly connected to monitor the rate of tire rotation.

In one embodiment, the vehicle is programmed to transport itself to a particular destination using GPS coordinates. In another embodiment, a camera mounted on the vehicle, such as supported by the frame 20, is used to provide feedback to a remote supervisory control facility, where an operator then controls the speed and direction of the vehicle using a joystick or other control. The communications may be tethered or by various telemetry methods including ultrasonic, radio frequency, optical, or any of various methods enabling physical separation of the vehicle from its supervisory control location. The balancing of the vehicle is performed automatically, as previously discussed. The vehicle may be used for surveillance in hostile environments or may be used to deliver payloads.

The speed of the vehicle is controlled by the control system controlling the amount of fuel and air injected into the combustion engine cylinders. In FIG. 5, the engine has two cylinders. In one embodiment, the propulsion motor is an electric motor and the vehicle contains rechargeable batteries for driving the motor. In such a case, a transmission system is optional since the motor can be operated at any speed. Solar cells may be used to recharge the batteries, enabling the vehicle to explore other planets' surfaces. In another embodiment, each wheel may be powered independently by its own electric motor, eliminating the need not only for a transmission, but also for the differential transmission assembly. Although such an arrangement may reduce the range or speed performance of the vehicle, it would reduce the noise generated by the vehicle and simplify certain details of its mechanical construction.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. The term "invention," as used herein, frequently refers to the overall vehicle, although individual components within the vehicle may themselves be inventive when not in combination with all other described features of the vehicle. Therefore, the claims themselves represent the true inventions.

What is claimed is:
1. A vehicle comprising:
a wheel having a diameter, an outer periphery of the wheel for contacting a surface for moving relative to the surface;

a support structure circumscribed by the wheel, wherein the wheel rotates about the support structure;

a propulsion system circumscribed by the wheel and connected to the support structure, the propulsion system being coupled to the wheel for rotating the wheel around the propulsion system, thus propelling the wheel along the surface; and an automatic balancing system circumscribed by the wheel and connected to the support structure, the balancing system comprising:

a flywheel that is controllable to spin around a flywheel spin axis, the flywheel spin axis being connected to the support structure by a pivot that is rotatable to orient the flywheel in different directions, whereby changing a direction of the flywheel spin axis places a torque on the support structure; and a control system configured to receive signals from one or more sensors in the vehicle providing balancing information, the control system being coupled to the pivot to orient the flywheel in different directions to adjust an attitude of the vehicle for maintaining balance of the vehicle.

2. The vehicle of claim 1 wherein the wheel is a first wheel, the vehicle further comprising a second wheel, wherein the support structure, propulsion system, and balancing system are circumscribed by the first wheel and the second wheel, wherein the first wheel and the second wheel are coupled to the propulsion system such that the first wheel and the second wheel may rotate at different speeds.

3. The vehicle of claim 1 wherein the propulsion system comprises a propulsion motor and transmission coupling the propulsion motor to the wheel.

4. The vehicle of claim 1 wherein the control system orients the flywheel in different directions to steer the vehicle.

5. The vehicle of claim 1 wherein the flywheel is a first flywheel, the vehicle further comprising a second flywheel that is controllable to spin around its associated flywheel spin axis, the associated flywheel spin axis being connected to the support structure by an associated pivot that is rotatable to orient the second flywheel in different directions, whereby changing a direction of the associated flywheel spin axis places a torque on the support structure.

6. The vehicle of claim 5 wherein the second flywheel is configured to cancel any unwanted torque generated by the first flywheel.

7. The vehicle of claim 1 wherein the control system comprises a flywheel orientation motor coupled to the flywheel spin axis to change the direction of the flywheel spin axis.

8. The vehicle of claim 1 wherein the control system comprises a braking structure that decelerates rotation of the flywheel to provide a torque on the support structure for changing a tilt of the vehicle.

9. The vehicle of claim 1 wherein the flywheel comprises a motor that rotates about the flywheel spin axis, the control system comprising a power system coupled to the motor, the control system being configured to supply different drive signals to the motor to vary a rotational speed of the motor to adjust the attitude of the vehicle.

10. The vehicle of claim 1 wherein the wheel is a first wheel, the vehicle further comprising a second wheel, wherein the support structure, propulsion system, and balancing system are circumscribed by the first wheel and the second wheel, wherein the first wheel and the second wheel are coupled to the propulsion system such that the first wheel and the second wheel may rotate at different speeds, and wherein the propulsion system comprises:

a propulsion motor;

a transmission system coupled to the propulsion motor, the transmission system providing a drive torque;

a differential gear assembly coupled to the transmission system and to the first wheel and the second wheel, the differential gear assembly splitting the drive torque between the first wheel and the second wheel while allowing the first wheel and the second wheel to rotate at different speeds; and a steering assembly coupled to the differential gear assembly, the steering assembly comprising a steering motor, the steering assembly being configured to supply a steering torque to the drive torque, where the steering torque is oppositely applied to the first wheel and second wheel to control relative rotations of the first wheel and the second wheel, enabling the first wheel and the second wheel to rotate in opposite directions to turn the vehicle.

11. The vehicle of claim 1 wherein the vehicle has roll, pitch, and yaw axes, and wherein the automatic balancing system provides torques about the roll, pitch, and yaw axes.

12. The vehicle of claim 1 wherein the one or more sensors comprise a plurality of attitude sensors for determining orientation of the vehicle.

13. The vehicle of claim 1 wherein a center of mass of the vehicle is located below an axis of rotation of the wheel.

14. The vehicle of claim 1 wherein the wheel is a first wheel, the vehicle further comprising a second wheel, wherein the support structure, propulsion system, and balancing system are circumscribed by the first wheel and the second wheel, wherein axes of rotation of the first wheel and the second wheel are coaxial and the wheels are separated by at most 20% of one wheel diameter.

15. The vehicle of claim 1 wherein the wheel comprises a tire, wherein a profile of the tire perpendicular to the tire's diameter is a curve, the curve being convex away from the center of mass of the vehicle such that the vehicle's center of mass is at a minimum gravitational potential energy state at zero lean of the vehicle.

16. A vehicle comprising:

a first wheel having a first diameter, an outer periphery of the first wheel for contacting a first portion of a surface;

a second wheel having a diameter equal to the first diameter, an outer periphery of the second wheel contacting a second portion of the surface;

a support structure circumscribed by the first wheel and the second wheel, wherein the first wheel and the second wheel rotate about the support structure;

a propulsion system circumscribed by the first wheel and the second wheel and connected to the support structure, the propulsion system being coupled to the first wheel and the second wheel for rotating the first wheel and the second wheel around the propulsion system in a same direction to propel the vehicle in a forward direction, the propulsion system providing a drive torque to the first wheel and the second wheel; and a steering assembly coupled to the first wheel and the second wheel, the steering assembly comprising a steering motor, the steering assembly being configured to supply a steering torque to the drive torque, where the steering torque is oppositely applied to the first wheel and second wheel to control relative rotations of the first wheel and the second wheel, enabling the first wheel and the second wheel to rotate in opposite directions to turn the vehicle when the first wheel and the second wheel are both in contact with the surface.

17. The vehicle of claim 16 wherein the drive torque is substantially zero when the steering assembly rotates the first wheel and the second wheel in opposite directions.

18. The vehicle of claim 16 wherein the propulsion system comprises:
 a propulsion motor;
 a transmission system coupled to the propulsion motor, the transmission system providing the drive torque; and
 a differential gear assembly coupled to the transmission system and to the first wheel and the second wheel, the differential gear assembly splitting the drive torque between the first wheel and the second wheel thereby allowing the first wheel and the second wheel to rotate at different speeds,
 wherein the steering assembly is coupled to the differential gear assembly.

19. The vehicle of claim 16 wherein the propulsion system comprises:
 a differential gear assembly, the differential gear assembly comprising a first differential gear coupled to the first wheel and a second differential gear coupled to the second wheel, the differential gear assembly splitting the drive torque between the first wheel and the second wheel thereby allowing the first wheel and the second wheel to rotate at different speeds;
 wherein the steering assembly comprises a steering gear engaging the first differential gear and the second differential gear, the steering gear being coupled to the steering motor for rotating the steering gear to cause the first differential gear and the second differential gear to rotate in opposite directions.

20. The vehicle of claim 19 wherein the steering gear is a pinion gear that engages teeth of the first differential gear and the second differential gear, wherein the pinion gear rotates about its axis of rotation to rotate the first differential gear and the second differential gear in opposite directions.

21. The vehicle of claim 20 wherein the pinion gear also rotates in a plane parallel to first differential gear and the second differential gear when the vehicle is moving in a forward direction.

22. A method for automatically balancing a vehicle, the vehicle being of the type comprising a wheel, the wheel having a diameter, an outer periphery of the wheel for contacting a surface for moving relative to the surface, the vehicle further including a support structure circumscribed by the wheel, wherein the wheel rotates about the support structure, the vehicle further including a propulsion system circumscribed by the wheel and connected to the support structure, the propulsion system being coupled to the wheel for rotating the wheel around the propulsion system, thus propelling the wheel along the surface, the vehicle requiring an automatic balancing system to be in a balanced state, the method comprising:
 providing a flywheel, circumscribed by the wheel, that spins around a flywheel spin axis, the flywheel spin axis being connected to the support structure by a pivot;
 sensing an imbalance in the vehicle; and
 in response to sensing the imbalance, automatically rotating the flywheel around the pivot to change a direction of the flywheel spin axis so as to place a torque on the support structure to adjust an attitude of the vehicle.

23. The method of claim 22 further comprising changing a rotational speed of the flywheel around the spin axis thereby placing a torque on the support structure to adjust an attitude of the vehicle for maintaining balance of the vehicle.

24. The method of claim 23 wherein changing a rotational speed of the flywheel around the spin axis comprises mechanically braking the flywheel.

25. The method of claim 22 wherein rotating the flywheel around the pivot corrects for imbalance about a roll axis, the roll axis being parallel to the surface in contact with the wheel and in the direction of movement of the vehicle.

26. The method of claim 22 further comprising rotating the flywheel around the pivot, so as to place a torque on the support structure, causing the vehicle to lean in order to steer the vehicle.

27. The method of claim 22 further comprising changing a rotational speed of the flywheel around the spin axis, so as to place a torque on the support structure, causing the vehicle to lean in order to steer the vehicle.

28. The method of claim 22 further comprising performing at least one of rotating the flywheel around the pivot and changing a rotational speed of the flywheel around the spin axis for righting the vehicle from a horizontal position.

29. The method of claim 28 wherein the vehicle has a roll axis, wherein righting the vehicle from a horizontal position comprises:
 establishing a first angular momentum of the flywheel oriented substantially parallel to the roll axis; and
 changing the angular momentum to cause a reactionary torque, righting the vehicle.

30. The method of claim 29 wherein changing the angular momentum comprises braking the flywheel.

31. The method of claim 30 wherein braking the flywheel is sufficiently rapid to cause the vehicle to experience an aerial phase as it is righted, where the vehicle is temporarily not in contact with the surface.

32. The method of claim 22 wherein sensing an imbalance in the vehicle and rotating the flywheel around the pivot comprises:
 determining a present attitude vector of the vehicle;
 determining a net torque vector that, if provided to the vehicle, would provide an acceleration about roll, pitch, and yaw axes of the vehicle;
 determining control signals needed to change an angular momentum of the flywheel; and
 applying said control signals to produce a desired net torque vector.

33. The method of claim 22 wherein sensing an imbalance in the vehicle and rotating the flywheel around the pivot comprises:
 determining a present attitude vector of the vehicle and a time rate of change of the attitude vector;
 determining a net torque vector that, if provided to the vehicle, would provide an acceleration about roll, pitch, and yaw axes of the vehicle;
 determining control signals needed to change an angular momentum of the flywheel; and
 applying said control signals to produce a desired net torque vector.

34. A method for steering a vehicle, the vehicle being of the type having a first wheel having a first diameter, an outer periphery of the first wheel contacting a first portion of a surface, the vehicle also including a second wheel having a diameter equal to the first diameter, an outer periphery of the second wheel contacting a second portion of the surface, the vehicle also including a support structure circumscribed by the first wheel and the second wheel, wherein the first wheel and the second wheel rotate about the support structure, the vehicle also including a propulsion system circumscribed by the first wheel and the second wheel and connected to the support structure, the propulsion system being coupled to the first wheel and the second wheel for rotating the first wheel and the second wheel around the propulsion system in a same direction to propel the vehicle in a forward direction, the propulsion system providing a drive torque to the first wheel and the second wheel; the method comprising:

providing a steering assembly coupled to the first wheel and the second wheel, the steering assembly comprising a steering motor, separate from the propulsion system; and actuating the steering motor to supply a steering torque to the drive torque, where the steering torque is oppositely applied to the first wheel and second wheel to control relative rotations of the first wheel and the second wheel, enabling the first wheel and the second wheel to rotate in opposite directions to turn the vehicle when the first wheel and the second wheel are both in contact with the surface.

35. The method of claim 34 wherein the propulsion system comprises a differential gear assembly, the differential gear assembly comprising a first differential gear coupled to the first wheel and a second differential gear coupled to the second wheel, the differential gear assembly splitting the drive torque between the first wheel and the second wheel while allowing the first wheel and the second wheel to rotate at different speeds, and wherein the steering assembly comprises a steering gear engaging the first differential gear and the second differential gear, the steering gear being coupled to the steering motor, the method further comprising:

actuating the steering motor for rotating the steering gear to cause the first differential gear and the second differential gear to rotate in opposite directions.

36. The method of claim 35 wherein the steering gear is a pinion gear that engages teeth of the first differential gear and the second differential gear, wherein the pinion gear rotates about its axis of rotation to rotate the first differential gear and the second differential gear in opposite directions.

37. The method of claim 36 wherein the pinion gear also rotates in a plane parallel to the first differential gear and the second differential gear when the vehicle is moving in a forward direction.

38. A differential gear assembly comprising:
a first rotating element driven by a first drive system;
a first differential gear coupled to the first rotating element, wherein rotation of the first rotating element rotates the first differential gear;
a first output shaft coupled to a first wheel for rotating the first wheel, the first output shaft being coupled to the first differential gear such that rotation of the first differential gear rotates the first wheel;
a second differential gear coupled to the first differential gear so as to allow the second differential gear and the first differential gear to rotate at different speeds;
a second output shaft coupled to a second wheel for rotating the second wheel, the second output shaft being coupled to the second differential gear such that rotation of the second differential gear rotates the second wheel;
a differential gear coupling engaging both the first differential gear and the second differential gear so as to substantially evenly split a first input torque from the first rotating element between the first output shaft and the second output shaft; and
a second rotating element driven by a second drive system, the second rotating element engaging the first differential gear and the second differential gear, wherein rotating the second rotating element changes a torque applied to the first differential gear by a first magnitude and changes a torque applied to the second differential gear by a second magnitude opposite to the first magnitude.

39. The differential gear assembly of claim 38 wherein the second rotating element comprises a pinion gear that engages teeth of the first differential gear and teeth of the second differential gear, wherein the pinion gear rotates about its axis of rotation to change the torque applied to the first differential gear by the first magnitude and change the torque applied to the second differential gear by the second magnitude opposite to the first magnitude.

40. The differential gear assembly of claim 39 wherein the teeth of the first differential gear and the teeth of the second differential gear face each other, and wherein the pinion gear is sandwiched between the first differential gear and the second differential gear.

41. The differential gear assembly of claim 40 wherein the pinion gear has a shaft that extends beyond a periphery of the first differential gear and the second differential gear, wherein the shaft is engaged and rotated by the second rotating element.

42. The differential gear assembly of claim 41 wherein the pinion gear, by simultaneously engaging the teeth of the first differential gear and the teeth of the second differential gear, revolves around an axis of rotation of the first differential gear and the second differential gear while also allowing the pinion gear to independently rotate about its axis of rotation.

43. The differential gear assembly of claim 42 wherein the second rotating element comprises a ring gear that circumscribes the first differential gear and the second differential gear, the ring gear engaging teeth formed around the pinion gear shaft, wherein rotation of the ring gear by the second drive system rotates the pinion gear about its axis of rotation.

* * * * *